United States Patent
Obasanjo et al.

(10) Patent No.: US 11,113,732 B2
(45) Date of Patent: Sep. 7, 2021

(54) CONTROLLING USE OF NEGATIVE FEATURES IN A MATCHING OPERATION

(71) Applicant: Microsoft Technology Licensing, LLC, Redmond, WA (US)

(72) Inventors: Oludare Victor Obasanjo, Renton, WA (US); Pankesh Jhaveri, Bellevue, WA (US); Weiqing Tu, Bellevue, WA (US); Rui Zhou, Bellevue, WA (US); Bhuvan Middha, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1080 days.

(21) Appl. No.: 15/276,754

(22) Filed: Sep. 26, 2016

(65) Prior Publication Data
US 2018/0089191 A1 Mar. 29, 2018

(51) Int. Cl.
G06Q 30/02 (2012.01)
G06F 16/33 (2019.01)

(52) U.S. Cl.
CPC ....... G06Q 30/0277 (2013.01); G06F 16/334 (2019.01)

(58) Field of Classification Search
CPC .......................... G06Q 30/0277; G06F 16/334
USPC ................................................. 707/721, 769
See application file for complete search history.

(56) References Cited

U.S. PATENT DOCUMENTS

| 7,752,073 | B2 | 7/2010 | Barry et al. |
| 8,533,225 | B2 | 9/2013 | Goenka |
| 8,745,753 | B1 | 6/2014 | Gottlieb et al. |
| 9,092,506 | B1* | 7/2015 | Kates ..................... G06F 16/288 |
| 2001/0047297 | A1 | 11/2001 | Wen |
| 2002/0156917 | A1* | 10/2002 | Nye ....................... H04L 63/104 |
|  |  |  | 709/238 |
| 2006/0149625 | A1* | 7/2006 | Koningstein .......... G06Q 30/02 |
|  |  |  | 705/14.54 |

(Continued)

FOREIGN PATENT DOCUMENTS

WO 2001004784 A2 1/2001

OTHER PUBLICATIONS

Kumar, Udaya, "Adwords—Using Dynamic Search Ads," available at <<http://seoanalystudaya.blogspot.in/2016/03/adwords-using-dynamic-search-ads.html>>, SEO & Web Development, accessed on Jul. 4, 2016, 6 pages.

(Continued)

Primary Examiner — Irete F Ehichioya
Assistant Examiner — Huen Wong

(57) ABSTRACT

A computer-implemented technique is described herein for assisting an administrative user in generating negative feature information. The negative feature information, which includes a list of negative features (e.g., negative keywords), defines when queries submitted by end users are expressly disqualified as matching one or more parts of an identified web resource. The technique then automatically assesses the manner in which the negative feature information conflicts with matching between the queries submitted by end users and positive trigger information associated with the web resource, to provide conflict output information. The technique then modifies the negative feature information based on the conflict output information, e.g., by eliminating one or more negative keywords that contribute to conflicts.

20 Claims, 12 Drawing Sheets

(56) References Cited

U.S. PATENT DOCUMENTS

| | | | | |
|---|---|---|---|---|
| 2007/0174118 A1* | 7/2007 | Dekel | ................... | G06Q 30/02 705/14.54 |
| 2007/0239542 A1 | 10/2007 | Shapiro | | |
| 2008/0249875 A1* | 10/2008 | Lee | ....................... | G06Q 30/02 705/14.52 |
| 2009/0292677 A1* | 11/2009 | Kim | ..................... | G06F 16/958 |
| 2010/0042495 A1* | 2/2010 | Malden | ................. | G06Q 30/02 705/14.48 |
| 2010/0185661 A1* | 7/2010 | Malden | ................. | G06Q 10/06 707/769 |
| 2010/0241516 A1* | 9/2010 | Kim | ................... | G06Q 30/0277 705/14.73 |
| 2011/0047136 A1* | 2/2011 | Dehn | ................... | G06F 16/951 707/706 |
| 2011/0251893 A1* | 10/2011 | Bladel | ............... | G06Q 30/0256 705/14.54 |
| 2014/0351273 A1* | 11/2014 | Yoon | ....................... | G06F 16/33 707/754 |
| 2015/0278200 A1 | 10/2015 | He et al. | | |
| 2015/0371262 A1 | 12/2015 | Anspach et al. | | |
| 2016/0034571 A1* | 2/2016 | Setayesh | ............... | G06F 16/353 707/738 |

OTHER PUBLICATIONS

Cooan, Heather, "AdWords Keyword Diagnosis Report: Diagnosis Statuses Decoded," available at <<https://www.searchenginejournal.com/adwords-keyword-diagnosis-report-diagnosis-statuses-decoded/94265/>>, SEJ Search Engine Journal, published on Mar. 28, 2014, 17 pages.

Morris, Katrina, "Bing Ads Academy: How to Use the Negative Keyword Conflict Report," available at <<http://ads.bingads.microsoft.com/en-in/blog/28455/bing-ads-academy-how-to-use-the-negative-keyword-conflict-report>>, Bing ads, Microsoft Corporation, Redmond, WA, published on May 27, 2014, 3 pages.

"Conflicting Negative Keywords," available at <<https://developers.google.com/adwords/api/docs/guides/conflicting-negative-keywords>>, Google Developers, AdWords API, Google Inc., Mountain View, CA, Jun. 30, 2015, 9 pages.

"About keyword matching options," available at <<https://support.google.com/adwords/answer/2497836?hl=en>>, accessed on Jul. 4, 2016, AdWords Help, Google Inc., Mountain View, CA, 5 pages.

Shewan, Dan, "The Beginner's Guide to Building a Negative Keyword List," available at <<http://www.wordstream.com/blog/ws/2014/03/04/negative-keyword-list>>, Word Stream, published on Mar. 4, 2014, 26 pages.

\* cited by examiner

CONTROLLING USE OF NEGATIVE FEATURES IN A MATCHING OPERATION

BACKGROUND

Some traditional delivery systems of information items (such as electronic ads) permit an administrative user to specify both positive keywords and negative keywords. A positive keyword serves as a basis for determining when a query submitted by an end user matches a particular electronic ad. A negative keyword serves as a basis for determining when a query is explicitly disqualified from matching a particular electronic ad. For example, consider an administrative user who provides an electronic ad related to an antivirus scanning program. That administrative user may choose the word "radar" as a negative keyword to prevent a user who is searching for a "radar scanner" from receiving electronic ads related to the antivirus scanning program.

Efforts are underway in the industry to provide technology which automates the generation and delivery of information items (e.g., electronic ads). For example, some systems automatically determine when a user's query pertains to a particular web page, and then automatically generate an electronic ad that relates to the web page. But these systems still rely on a large amount of manual analysis and fine-tuning by the administrative user. Indeed, some of these systems introduce further complexity that may actually increase the amount of manual analysis and revision required by an administrative user. Any interaction with a human analyst is time-consuming, costly, and prone to error.

SUMMARY

A computer-implemented technique is described herein for assisting an administrative user in generating negative feature information. The negative feature information, which includes a list of negative features (e.g., negative keywords), defines when queries submitted by end users are expressly disqualified as matching one or more parts of an identified web resource. The technique then automatically assesses the manner in which the negative feature information conflicts with matching between the queries submitted by end users and positive trigger information associated with the web resource, to provide conflict output information. The technique then modifies the negative feature information based on the conflict output information, e.g., by eliminating one or more negative keywords that contribute to conflicts.

Overall, the computer-implemented technique provides a control mechanism for adjusting the use of negative feature information in an information matching operation, e.g., by adjusting the characteristics of an information filter used in the information matching operation. The technique improves the relevance of information items that are delivered to end users and also reduces the amount of manual fine-tuning required by the administrative user.

The above technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

Figure 1:
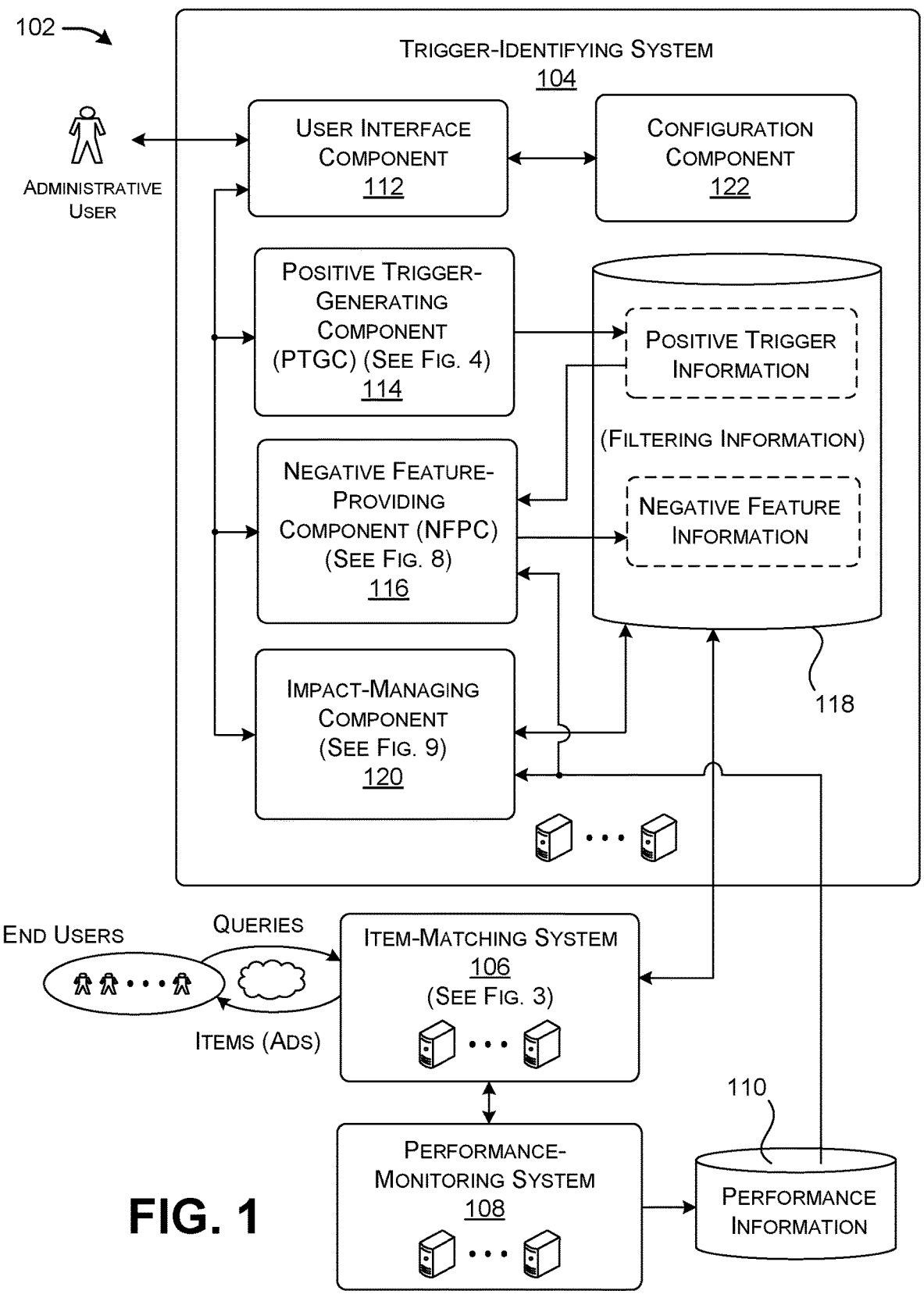
FIG. 1 shows an overview of a system environment for controlling the use of negative feature information in the selection of information items (e.g., electronic ads).

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computer-implemented system for controlling the use of negative feature information in the selection of information items (such as electronic ads). Section B sets forth illustrative methods which explain the operation of the system of Section A. Section C describes illustrative computing functionality that can be used to implement any aspect of the features described in Sections A and B. And Section D provides information regarding a machine-learned semantic model that can be used to determine the relation of two linguistic items.

As a preliminary matter, some of the figures describe concepts in the context of one or more structural components, also referred to as functionality, modules, features, elements, etc. In one implementation, the various components shown in the figures can be implemented by software running on computer equipment, or hardware (e.g., chip-implemented logic functionality), etc., or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. Section C provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts can be implemented by software running on computer equipment, or hardware (e.g., chip-implemented logic functionality), etc., or any combination thereof.

As to terminology, the phrase "configured to" encompasses various physical and tangible mechanisms for performing an identified operation. The mechanisms can be configured to perform an operation using, for instance, software running on computer equipment, hardware (e.g., chip-implemented logic functionality), etc., or any combination thereof.

The term "logic" encompasses various physical and tangible mechanisms for performing a task. For instance, each operation illustrated in the flowcharts corresponds to a logic component for performing that operation. An operation can be performed using, for instance, software running on computer equipment, hardware (e.g., chip-implemented logic functionality), etc., or any combination thereof. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific terms "computer-readable storage medium" and "computer-readable storage medium device" expressly exclude propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative System

FIG. 1 shows an overview of a system environment 102 for controlling the use of negative feature information in the selection of information items. To facilitate explanation, the examples set forth herein pertain to the case in which the information items correspond to electronic ads. But the system environment 102 can be used to select and deliver other types of content items (besides electronic ads), such as document items, image items, etc.

By way of overview, a trigger-identifying system 104 receives information from an administrative user (e.g., an advertiser) regarding a web resource. The web resource may correspond to a web site that includes one or more web pages describing a particular product or a collection of products, for which the administrative user seeks to generate ads in an automated manner. In response to the administrative user's input, the trigger-identifying system 104 generates filter information. The filter information, in turn, includes positive trigger information and negative feature information.

The positive trigger information serves as a basis for determining (by an item-matching system 106) whether an end user's input query qualifies as a match with a part of the web resource. The positive trigger information includes a set of positive trigger features. For instance, the positive trigger features may include positive keywords and positive key phrases. In one case, the item-matching system 106 may determine whether an end user's input query matches the positive trigger information by determining whether that query contains a positive keyword included in the positive trigger information. The positive trigger information may also include more abstract positive trigger features, such as semantic vectors within an abstract semantic space. The item-matching system 106 may determine whether an end user's input query matches a positive semantic vector by mapping the query into an input query vector within the semantic space, and then determining whether that input query vector matches (or is within a prescribed distance of) a positive semantic vector specified in the positive trigger information.

The negative feature information serves as a basis for determining (by the item-matching system 106) whether an end user's query is explicitly disqualified as matching a part of the web resource. The negative feature information includes a set of negative features, corresponding to any of negative keywords, negative key phrases, negative semantic vectors, etc. The item-matching system 106 may determine whether an end user's input query constitutes a disqualifying query when that query contains a negative keyword in the negative feature information, or whether the query maps to a semantic vector that matches a negative semantic vector, and so on.

A performance-monitoring system 108 monitors the performance of the item-matching system 106, and provides resultant performance information for storage in a data store 110. More specifically, the performance-monitoring system 108 monitors the ability of the item-matching system 106 to generate impressions, e.g., by determining the relative success of the item-matching system 106 in matching queries submitted by end users to parts of the web resource. The performance-monitoring system 108 also monitors the ability of the item-matching system 106 to generate "clicks," e.g., by determining the extent to which the matches made by the item-matching system 106 lead to user traffic being directed to the web resource. That is, the matching performed by the item-matching system 106 leads to meaningful engagement when the user visits a page of the web resource in response to being served an ad for that page, and then dwells on that page.

The item-matching system 106 may provide sub-optimal results for several reasons. In one case, the item-matching system 106 may fail to match input queries against the web resource because the negative features are inappropriately disqualifying (or are projected to disqualify) too many otherwise qualifying input queries. The trigger-identifying system 104 includes logic (described below) for identifying the impact of negative feature information on the actual and/or predicted performance of the item-matching system 106, and taking corrective action to improve the performance of the item-matching system 106.

Now referring to the trigger-identifying system 104 in greater detail, the trigger-identifying system 104 includes a plurality of subcomponents that perform respective tasks, ultimately directed to the generation of the filter information.

A user interface component 112 provides one or more user interface presentations that allow the administrative user to describe the web resource, and to interact with other components of the trigger-identifying system 104. For example, the user may interact with the user interface component 112 to identify the web resource by specifying a uniform resource locator (URL) associated with the resource's general domain. The user may also interact with the user interface component 112 to specify parts of the web resource for which separate processing is desired. For example, a manufacturer of automobiles may provide a web site that describes economy cars, luxury cases, and sports cars. That manufacturer may interact with the user interface component 112 to specify a subset of pages that pertain to economy cars, a subset of pages that pertain to luxury cars, and a subset of pages that pertain to sports cars, etc. The trigger-identifying system 104 may respond to the user's demarcation of separate parts by providing separate analysis for the respective parts. Alternatively, the user may interact with the user interface component 112 to instruct the trigger-identifying system 104 to automatically identify its separate parts.

The administrative user may also interact with the user interface component 112 to specify rules that will govern the matching performed by the item-matching system 106. For example, the user may specify that input queries are to be matched against positive trigger features extracted from all of the pages of the web resource. In another case, the user may specify that input queries are to be matched against positive trigger features associated with certain parts of the web resource (rather than the web resource as a whole), such as URL information, title information, heading information, selected pages, and so on. In other cases, the user may describe the parts of the web resource in a conditional manner, e.g., by specifying pages (or a portion thereof) that have a certain keyword in their URL or title, etc.

Figure 4:
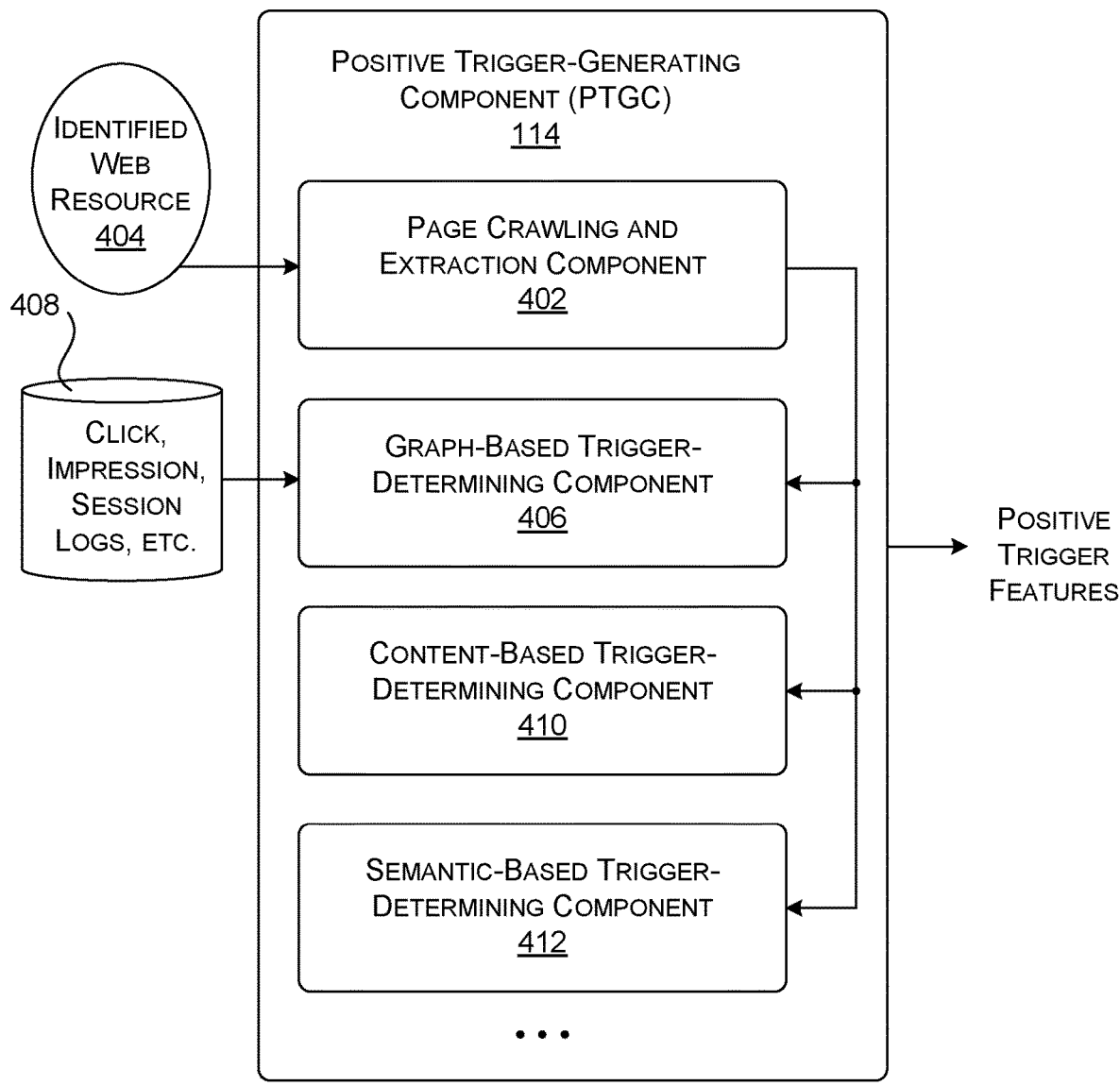
FIG. 4 shows one implementation of a positive trigger-generating component, which is another component of the system environment of FIG. 1.

A positive trigger-generating component (PTGC) 114 generates positive trigger information for the web resource identified by the user interface component 112, or at least the parts of the web resource defined by the user via the user interface component 112. For instance, the PTGC 114 can crawl the web resource to identify all of its pages, and then extract content from those pages. The PTGC 114 can then generate positive trigger features based on the extracted content. FIG. 4 (described below) provides additional information regarding one way in which the PTGC 114 can generate the positive trigger features. As noted above, the positive trigger information can be leveraged by the item-matching system 106 to determine when an input query can be considered as a match for a particular part of the web resource.

Figure 2:
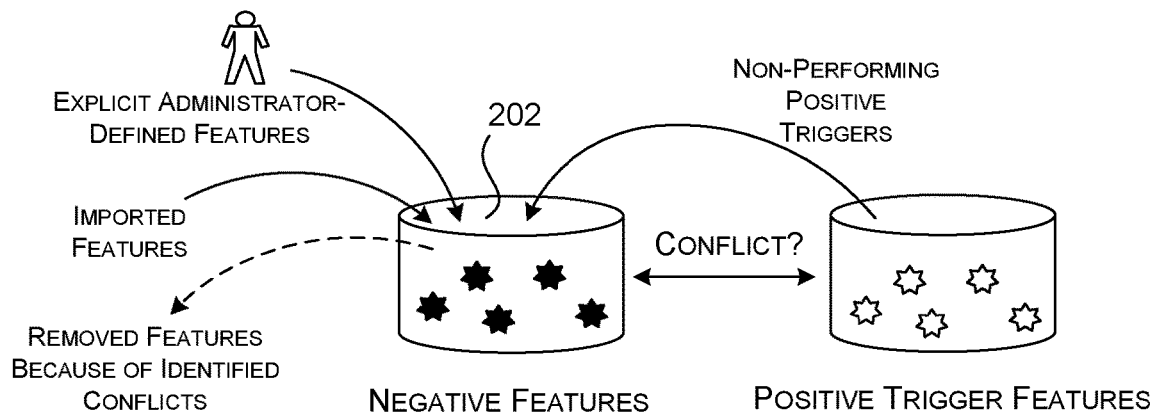
FIG. 2 shows an overview of a manner in which negative features are added and removed from a data store of negative feature information.
Figure 8:
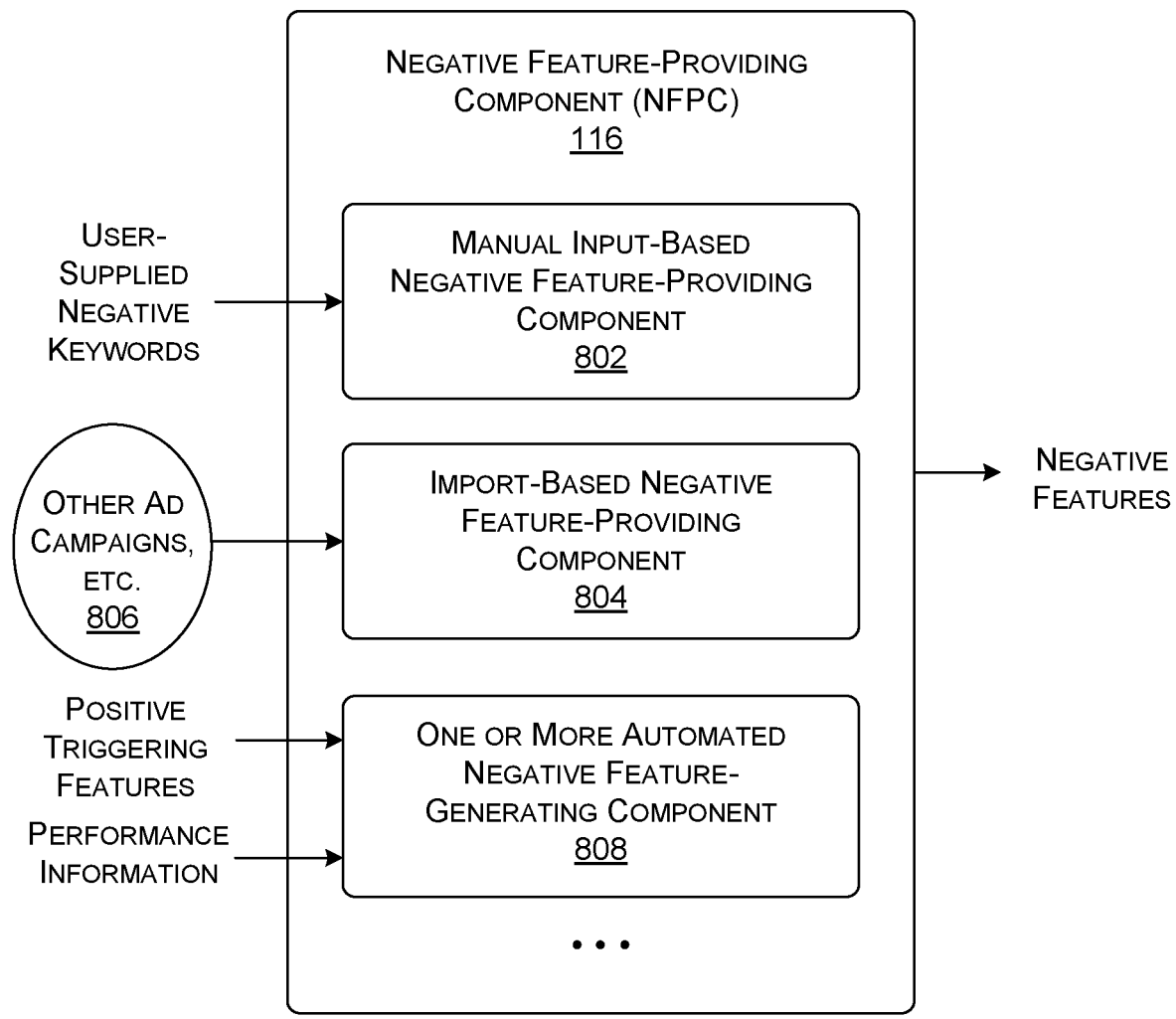
FIG. 8 shows one implementation of a negative feature-providing component, which is another component of the system environment of FIG. 1.

A negative feature-providing component (NFPC) 116 generates negative feature information, made up of negative features. FIGS. 2 and 8 (described below) provide additional information regarding one way in which the NFPC 116 can generate the negative features. As noted above, the negative feature information can be leveraged by the item-matching system 106 to determine when an input query can be considered as being explicitly disqualified as a match with respect to the web resource.

A data store 118 stores the positive trigger information and the negative feature information. As used herein, "filter information" or "filtering information" refers to the aggregate of the positive trigger information and the negative feature information.

An impact-managing component 120 determines an impact of the negative feature information on matching between input queries and the positive trigger information, to provide conflict output information. The impact-managing component 120 then instructs the NFPC 116 to modify the negative feature information based on the conflict output information. As will be described below, the impact-managing component 120 controls the operation of the NFPC 116 in either a manual mode or an automatic mode, or combination thereof.

A configuration component 122 permits the administrative user to control any aspect of the above-summarized operation of the trigger-identifying system 104. For example, the configuration component 122 can allow the administrative user to govern the manner in which the NFPC 116 adds new negative features to the negative feature information, and the manner in which the impact-managing component 120 removes negative features from the negative feature information.

Overall, the trigger-identifying system 104 provides a way of assisting the administrative user in generating the negative feature information and then continually updating the negative feature information to ensure its fitness for use by the item-matching system 106. In doing so, the trigger-identifying system 104 allows the administrative user to more quickly provide an effective body of negative features. From the perspective of the item-matching system 106, the use of effective negative feature information improves its ability to send relevant information items (e.g., electronic ads) to end users.

In other words, the system environment 102, considered as a whole, performs an information filtering operation. The filtering operation entails choosing appropriate information items (e.g., electronic ads) from a larger pool of candidate information items, based on the queries submitted by end users and based on the constraints specified by the filtering information. In this context, the triggering-identifying system 104 provides an automated or semi-automated way of adjusting the use of negative features in the information filtering operation. Metaphorically, the triggering-identifying system 104 adjusts the characteristics of the filter used in the information filtering operation, particularly with respect to the filter's use of negative features.

In terms of physical implementation, the trigger-identifying system 104 can be implemented by one or more computing devices, such as one or more backend server computing devices available to the administrative user. Likewise, the item-matching system 106 and the performance-monitoring system 108 can each be implemented by one or more server computing devices. In one use environment, the item-matching system 106 may correspond to part of a more inclusive computer-implemented search engine. Users may interact with the computer-implemented search engine over a computer network (e.g., the Internet), via respective user computing devices. The user computing devices can correspond to any computing equipment, such as stationary personal computing devices, handheld computing devices (e.g., smartphones), game consoles, set-top box devices, wearable computing devices, intelligent appliances, and so on.

FIG. 2 shows an overview of one manner by which negative features are added and removed from a data store 202 of negative feature information. More specifically, the NFPC 116 serves a role in adding new negative features to the negative feature information, while the impact-managing component 120 serves a role in removing existing negative features from the negative feature information.

With respect to adding new negative features, the NFPC 116 receives new negative features from multiple sources. For instance, the NFPC 116 can receive negative features in the form of negative keywords that the administrative user explicitly provides. The NFPC 116 can also receive negative features in the form of negative keywords from other ad campaigns. More specifically, the administrative user may run one or more traditional ad campaigns in parallel with the ad campaign associated with the system environment 102. The administrative user may have already specified positive keywords and negative keywords in connection with those traditional ad campaigns for use in triggering and repressing, respectively, the presentation of manually-created text ads. The NFPC 116 can import some or all of the negative keywords used in those pre-existing traditional ad campaigns.

As a third source, the NFPC 116 can examine the performance of the positive trigger features in the positive trigger information, based on performance information generated by the performance-monitoring system 108. As stated above, the performance indicates the extent to which the positive trigger features have been successful in matching user queries to parts of the identified web resource, and whether those matches then led to meaningful engagement by the end users with the web resource. Positive trigger features may fail for one or more reasons. For example, some positive trigger features may contribute to a low number of matches between queries and information items. Other positive trigger features may contribute to a high number of matches, but these matches are unsuccessful in procuring meaningful engagement by end users with the web resource. This latter deficiency suggests that the positive trigger features are causing the item-matching system 106 to displays ads that do not have a meaningful bearing on the user's search intent. The NFPC 116 can identifying these kinds of underperforming positive trigger features (particularly with respect to the second category of such features) and add them as negative features to the negative feature information. By doing so, the NFPC 116 can reduce the volume of ineffective ads generated by the item-matching system 106.

With respect to the feature-removal operation, the impact-managing component 120 can again rely on multiple criteria in its decision to remove existing negative features. In some situations, the impact-managing component 120 can remove (or suggest the removal of) a negative feature when it determines that the negative feature is semantically related to the content of the web resource, such that, if this negative feature were applied by the item-matching system 106, it would result in cancelling out what would otherwise be appropriate matches between certain user queries and the web resource. In other situations, the impact-managing component 120 can remove (or suggest the removal of) a negative feature based on an empirical determination that the negative feature is actually excluding meaningful query matches. In making this latter determination, the impact-managing component 120 can again rely on the performance information provided by the performance-monitoring system 108.

An example of the impact-managing component 120 will help make the above explanation more concrete. Assume that the web resource describes a particular kind of electric-powered car produced by a particular manufacturer. In the field of electric cars, the abbreviation "EV" stands for "electric vehicle." The administrative user may manually suggest that "EV" be added to the list of negative features because he or she is concerned that this keyword will result in poor ad-matching performance, e.g., because the administrative user understands that a search query including the keyword "EV" may not necessarily pertain to electric cars. But the impact-managing component 120 can immediately inform the administrative user that the introduction of this negative feature will result in excluding a significant number of legitimate matches between user queries and the web resource. Assume that the user nevertheless proceeds and chooses "EV" as a negative feature. The impact-managing component 120 can then inform the user that a significant number of actual queries submitted by end users have been excluded, when these queries would otherwise match one or more positive trigger features.

Additional information regarding the operation of the NFPC 116 and the impact-managing component 120 is set forth below in the context of the explanation of FIGS. 8 and 9, respectively.

Figure 3:
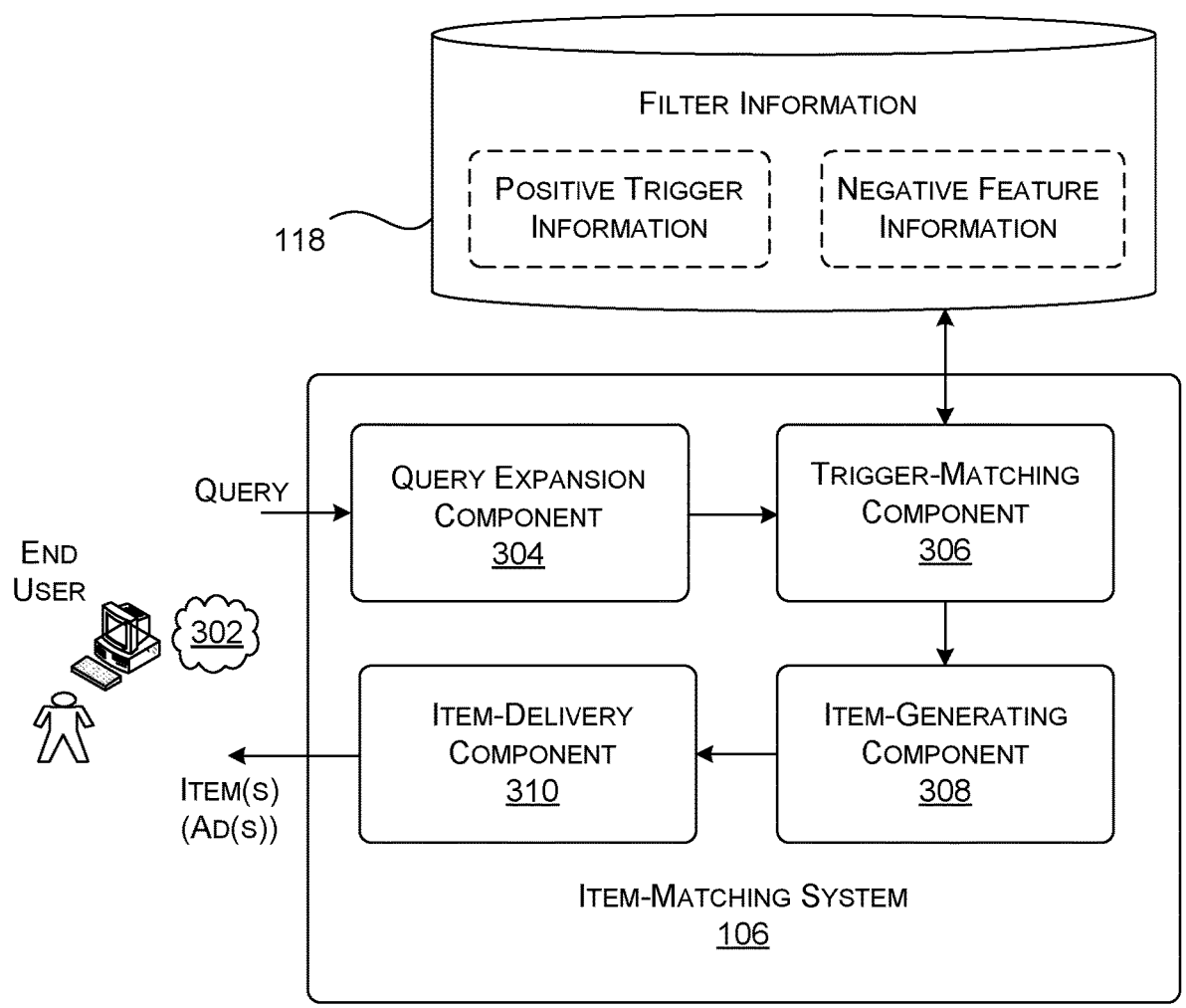
FIG. 3 shows one implementation of an item-matching system, which is a component of the system environment of FIG. 1.

FIG. 3 shows one implementation of the item-matching system 106, introduced above. While the item-matching system 106 is not the primary focus of the explanation presented herein, a description of the item-matching system 106 will ultimately clarify the role of the trigger-identifying system 104, which works in conjunction with the item-matching system 106.

To begin with, a front-end interface component (not shown) receives an end user's input query over a computer network 302. As mentioned above, the end user may submit the query using any user computing device. In one case, the end user submits the query as part of a formal search request, e.g., by typing the query into an input command field of a search engine's user interface page, or by speaking the query to a voice recognition interface. In another case, the user implicitly submits a query based on the user's online actions, such as the user's interaction with a particular document that pertains to a particular subject.

A query expansion component 304 uses various techniques to interpret and expand the submitted query. For instance, the query expansion component 304 can identify synonyms of the terms in the query and add those synonyms to the submitted query. The query expansion component 304 can use known parsing technology to interpret the parts of speech associated with the query, and add that part-of-speech information to the submitted query. Alternatively, or in addition, the query expansion component 304 can map the query to a vector in an abstract semantic space (e.g., using the technique described in Appendix D), and add that embedding to the submitted query, and so on. The query expansion component 304 can use yet other techniques (such as spelling correction, named entity recognition, etc.); the techniques described above are cited by way of example, not limitation.

A trigger-matching component 306 determines whether the expanded query matches any of the positive trigger features. To provide a straightforward example, assume that a positive trigger feature includes the key phrase, "Ford Focus Electric." The trigger-matching component 306 determines whether the expanded query includes a term that matches the phrase "Ford Focus Electric," or is considered sufficiently similar to the term "Ford Focus Electric" based on any assessment of similarity (such as edit distance, etc.). In another case, assume that a positive trigger feature includes a certain vector in abstract vector space. The trigger-matching component 306 determines whether the submitted query maps to a vector that is within a prescribed distance of the positive trigger feature. One way of measuring distance in abstract semantic space is set forth in Appendix D.

The trigger-matching component 306 can also determine whether any match is otherwise disqualified by any negative feature in the negative feature information. For example, assume that the user's query reads, "Ford Focus Electric EV." Further assume that a negative feature corresponds to the keyword "EV." The trigger-matching component 306 concludes that the submitted query matches a positive trigger, yet is disqualified because it also matches a negative keyword.

The trigger-matching component 306 can also take informational scope into consideration when performing matching between a query and a feature (that is, either a positive feature or a negative feature). For example, the trigger-matching component 306 can determine that the input query that includes the word "sneakers" is encompassed by the negative keyword "shoes," and, therefore, the query matches the negative keyword "shoes." The trigger-matching component 306 can perform matching of this nature in various ways, such as by consulting an ontology which identifies "sneakers" as a species of "shoes." The trigger-matching component 306 can also performing "fuzzy" matching by assigning a confidence score to a match to indicate a degree of likeness between a query and a feature (either positive or negative). For example, the trigger-matching component 306 can determine that "boots" is related to "shoes" based on the distance between these two terms' vector projections in abstract semantic space. Matches can be ranked, in part, based on their respective confidence scores assigned thereto.

Assume that the trigger-matching component 306 indicates that the user's query matches at least one positive trigger feature, and is not otherwise excluded by any negative features. If so, an item-generating component 308 automatically generates one or more information items (e.g., electronic ads) in a dynamic manner. As an aside, note that the trigger-matching component 306 can also apply additional considerations before selecting the electronic ad(s) to present to the user. For example, the trigger-matching component 306 can use conventional bidding analysis to choose a winning electronic ad (or ads), from among a pool of electronic ads that are otherwise determined to be relevant based on the filtering considerations described above.

The electronic ad generated by the item-generating component 308 includes plural parts, such as: a landing page URL; a display URL; a title; and a description. The landing page URL identifies the page that will be activated when the user clicks on or otherwise actives the electronic ad. With respect to the landing page URL, note that the query matches a particular positive trigger feature, and that particular positive trigger feature is associated with a particular web paging having a URL. The item-generating component 308 therefore defines the landing page URL as the URL of the web page which is associated with the match between the query and the positive trigger feature.

In one implementation, the item-generating component 308 can rely on the administrative user to manually define the display URL, the title, and the description. In another implementation, the item-generating component 308 can use one or more algorithms to automatically choose at least the title, and possibly some or all of the description. For example, the item-generating component 308 can define the title of the electronic ad as the title of the matching web page identified above. In other cases, the item-generating component 308 can generate the description of the electronic ad by mapping the original text of the web page to a high-level summary of the web page using a machine-trained model, such as a deep-learned neural network which converts input text into paraphrased output text.

The above-described ad-generation techniques are cited by way of example, not limitation; other implementations can use other document summarization techniques to define the electronic ad in at least a semi-automated manner. Further note that some implementations can perform at least parts of the ad generation process in advance, prior to a match between a query and a positive trigger feature.

Finally, an item-delivery component 310 delivers the generated electronic ad (or ads) to the end user who submitted the query. The item-delivery component 310 can deliver the ad in different ways. In one approach, the item-delivery component 310 can present the electronic ad as part of search results that are sent to the end user over the computer network 302. In another approach, the item-delivery component 310 can present the electronic ad as part of the page that the user happens to be viewing at the current time.

FIG. 4 shows one implementation of the positive trigger-generating component (PTGC) 114, which is another component of the system environment 102 of FIG. 1. First, a page crawling and extraction component 402 visits all of the pages associated with the web resource 404 identified by the user, e.g., by successively visiting all the URLs associated with the web resource 404. The page crawling and extraction component 402 then extracts the content of each such page. The content includes the URL itself, the title of the web page, the body of the web page, etc. In other cases, the user specifies only certain parts of the web resource 404. Here, the page crawling and extraction component 402 can process only those parts of the web resource 404.

In one implementation, the page crawling and extraction component 402 can also perform preliminary semantic analysis on the pages of the web resource, e.g., by mapping each page (or parts thereof) into a semantic vector. The page crawling and extraction component 402 can then perform clustering on the semantic vectors to group together related pages. As an end result, the page crawling and extracting component 402 can automatically discover the categories associated with the web resource without being manually informed about the categories by the administrative user.

The PTGC 114 then uses one or more components to generate the positive trigger features. More specifically, the PTGC 114 can generate one or more positive trigger features for each part (e.g., each page, category, etc.) of the web resource. Each positive trigger feature therefore maps back to one or more parts of the website. When the item-matching system 106 matches an input query to a positive trigger feature, the item-matching system 106 can leverage the above-described association to identify the part of the web resource that is relevant to the query.

Figure 5:
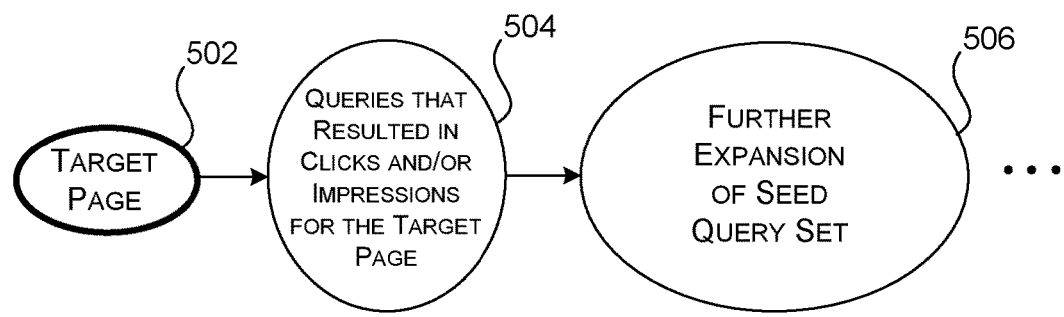
FIG. 5 shows one technique for use by a graph-based trigger-determining component, which is a component of the positive trigger-generating component of FIG. 4.

FIG. 4 specifies three illustrative components for generating positive trigger features, but other implementations can use any set of techniques. For example, a graph-based trigger-determining component 406 determines positive trigger features using a click log, impression log, search session log, etc., or any combination thereof, provided in one or more data stores 408. Advancing momentarily to FIG. 5, this figure shows one manner of operation of the graph-based trigger-determining component 406 for generating positive trigger features for a single target web page 502. The graph-based trigger-determining component can first identify a set of queries 504 which are associated with the target web page 502. For example, the graph-based trigger-determining component 406 can mine a click log to identify all those queries that users have submitted that subsequently resulted in the users selecting (e.g., clicking on) the target web page 502. Alternatively, or in addition, the graph-based trigger-determining component 406 can mine an impression log to identify all those queries that users have submitted that subsequently resulted in the users being offered the opportunity to select the target web page 502, e.g., because the target web page 502 was offered in a list of search results presented to users. Alternatively, or in addition, the graph-based trigger-determining component 406 can mine a session log to determine all those queries that users submitted in a search session, in which the users eventually clicked on the target page 502, and so on.

Next, the graph-based trigger-determining component 406 can optionally expand the set of queries 504 to find a larger set of queries 506. To cite one such expansion technique, the graph-based trigger-determining component 406 can use a co-click expansion technique by: (a) identifying a query in the first set of queries 504; (b) finding the set of pages that users clicked on in response to submitting the query; and (c) finding additional queries that users submitted prior to clicking on that set of pages. When finished, the graph-based trigger-determining component 406 can treat all or some of the queries that have been identified in the above process as positive trigger features.

Returning to FIG. 4, alternatively or in addition, the PTGC 114 can use a content-based trigger-determining component 410 to generate positive trigger features. The content-based trigger-determining component 410 works by extracting positive trigger features from the web resource 404 itself.

Figure 6:
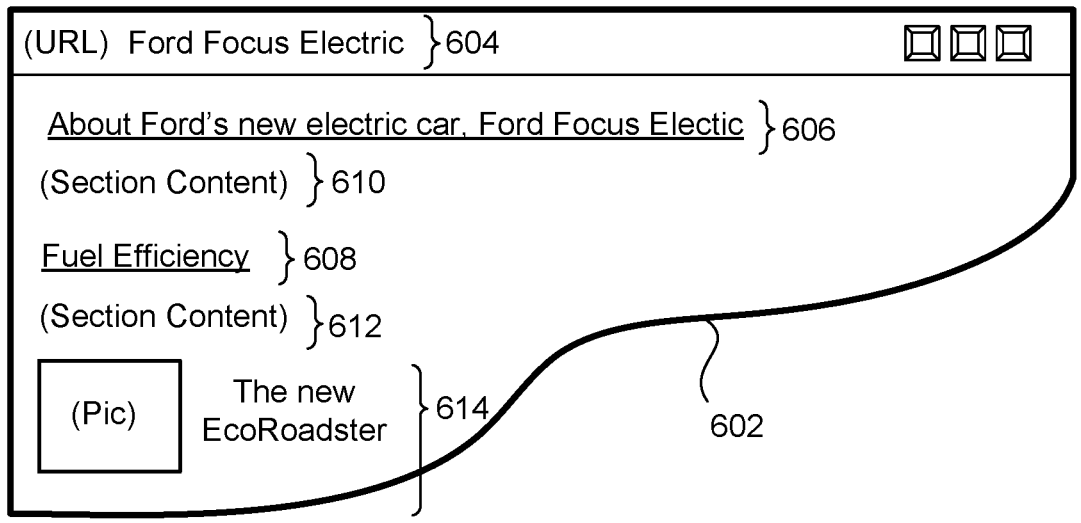
FIG. 6 shows one technique for use by a content-based trigger-determining component, which is a component of the positive trigger-generating component of FIG. 4.

For instance, advancing momentarily to FIG. 6, this figure shows part of an illustrative target web page 602. The web page includes a URL and a title 604. It may further include one or more section headings (606, 608) within its body, one or more section contents (610, 612), one or more picture captions 614, etc. The content-based trigger-determining component 410 can apply a set of rules to extract text from these fields of page content. For example, the content-based trigger-determining component 410 can use the strings provided in the title 604 and section headings (606, 608) as default positive trigger features.

In addition, or alternatively, the content-based trigger-determining component 410 can use a machine-trained model to assign a score to each candidate text fragment in the web page 602. The content-based trigger-determining component 410 can then select the n top-ranking text fragments as positive trigger features. The machine-trained model performs this task by mapping a set of feature values which describes each text fragment to a score. The feature values can include: the content of the text fragment itself; the position of the text fragment within the web page 602; the parts of speech associated with the text fragment; the frequency at which the text fragment occurs within the web page 602; the frequency at which the text fragment occurs within a larger corpus of information, and so on.

Other implementations can use yet other algorithms to extract meaningful positive trigger features from the web page 602, such as named entity extraction algorithms, machine-trained document summarization algorithms, and so on.

Returning to FIG. 4, a semantic-based trigger-determining component 412 can use various semantic techniques to find relevant positive trigger features. For instance, the semantic-based trigger-determining component 412 can use a deep-learning neural network to map a web page (or a portion thereof) to a web page vector in an abstract semantic space. The semantic-based trigger-determining component 412 can treat that web page vector as a first positive trigger feature. The semantic-based trigger-determining component 412 can also identify other linguistic items that map to vectors which lie within a prescribed distance to the web page vector in the semantic space (e.g., as measured using a cosine similarity metric or the like). These linguistic items constitute additional positive trigger features, and may correspond to other queries, other web page text fragments, etc.

In addition, the semantic-base trigger-determining component 412 can use the above-described semantic technique to find positive trigger features that are close to the positive trigger features identified by the graph-based trigger determining component 406. For example, the graph-based trigger-determining component 406 may identify that many users used the keyword "Plug-in car" to find a particular target web page. That keyword, "Plug-in car," constitutes a first positive trigger feature. The semantic-based trigger determining component 412 can map the keyword "Plug-in car" to a vector in the abstract semantic space, and then find other queries that map to a similar region within the semantic space. These additional queries constitute additional positive trigger features.

Figure 7:
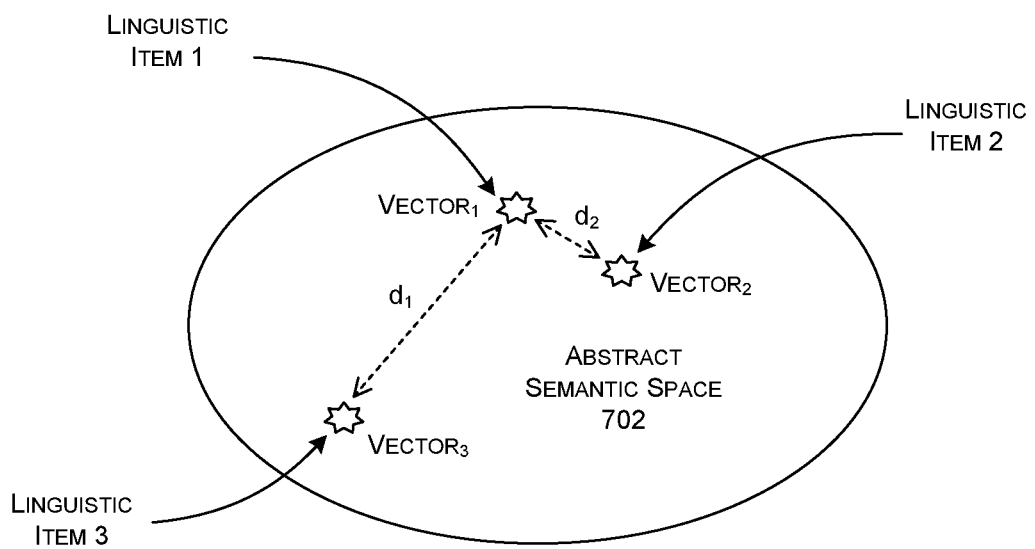
FIG. 7 shows one technique for use by a semantic-based trigger-determining component, which is a component of the positive trigger-generating component of FIG. 4.

FIG. 7 summarizes an abstract semantic space 702. A first and second linguistic items map to vectors that are relatively close together within the semantic space 702. This suggests that it is likely that the first and second linguistic items have similar meanings. A third linguistic item maps to a vector that is not close to either the first or second vectors. This suggests that it is likely that the third linguistic item is not related to either the first or second linguistic items. To repeat, Section D describes one technique for mapping linguistic items into the semantic space 702, and for comparing the vectors within the semantic space.

FIG. 8 shows one implementation of the negative feature-providing component (NFPC) 116, which was introduced in FIGS. 1 and 2. The purpose of the NFPC 116 is to provide negative features, which collectively constitute the negative feature information. As also described above, the NFPC 116 can use plural techniques to provide the negative features.

For instance, a manual input-based negative feature-provided component 802 ("manual component" for brevity)

provides a user interface presentation by which the administrative user can manually enter negative keywords. For example, again consider the case in which the administrative user wishes to direct traffic to a site describing the Ford Focus Electric car. The manual component 802 may receive the key phrase "Nissan Leaf" from the administrative user because the administrative user wishes to explicitly exclude queries in which the end user appears to be searching for an electric car provided by another manufacturer of electric cars.

An import-based negative feature-providing component 804 ("import-based component" for brevity) receives negative features (e.g., negative keywords) from other ad campaigns 806. For example, as explained above, one such other ad campaign can correspond to a traditional text ad campaign in which the user defines both positive keywords and negative keywords. The import-based component 804 can import the list of negative keywords from that traditional text ad campaign for use in the ad campaign associated with the system environment 102 of FIG. 1.

In yet other cases, the administrative user can instruct the import-based component 804 to collect the positive features of another ad campaign, which the import-based component 804 relabels as negative features for use by the item-matching system 106. By doing so, the administrative user can help ensure that the informational space carved out by the traditional ad campaign does not significantly overlap with the informational space associated with the item-matching system 106. This tactic, however, raises the possibility that the negative keywords thus defined will interfere with the operation of the item-matching system 106 in an unacceptable manner. If this proves to be true, the impact-managing component 120 can flag this issue and take corrective action, or allow the administrative user to take corrective action.

One or more automated negative feature-generating component 808 can add negative features in an automatic or semi-automatic manner. For example, a performance-based automated negative feature-generating component determines the performance of each positive trigger feature in the positive trigger information. If the performance is below a prescribed threshold, then the automated negative feature-generating component 808 can re-label that positive trigger feature as a negative feature and add it to the set of negative features. To repeat, a positive trigger feature that performs poorly may correspond to a feature that matches queries, but these matches do not direct a significant amount of user traffic to the web resources. As such, these matches may not reflect the user's true search intent. As an end result, a poorly-performing positive trigger feature may consume the advertising budget of the advertiser without providing any value to the advertiser.

Figure 9:
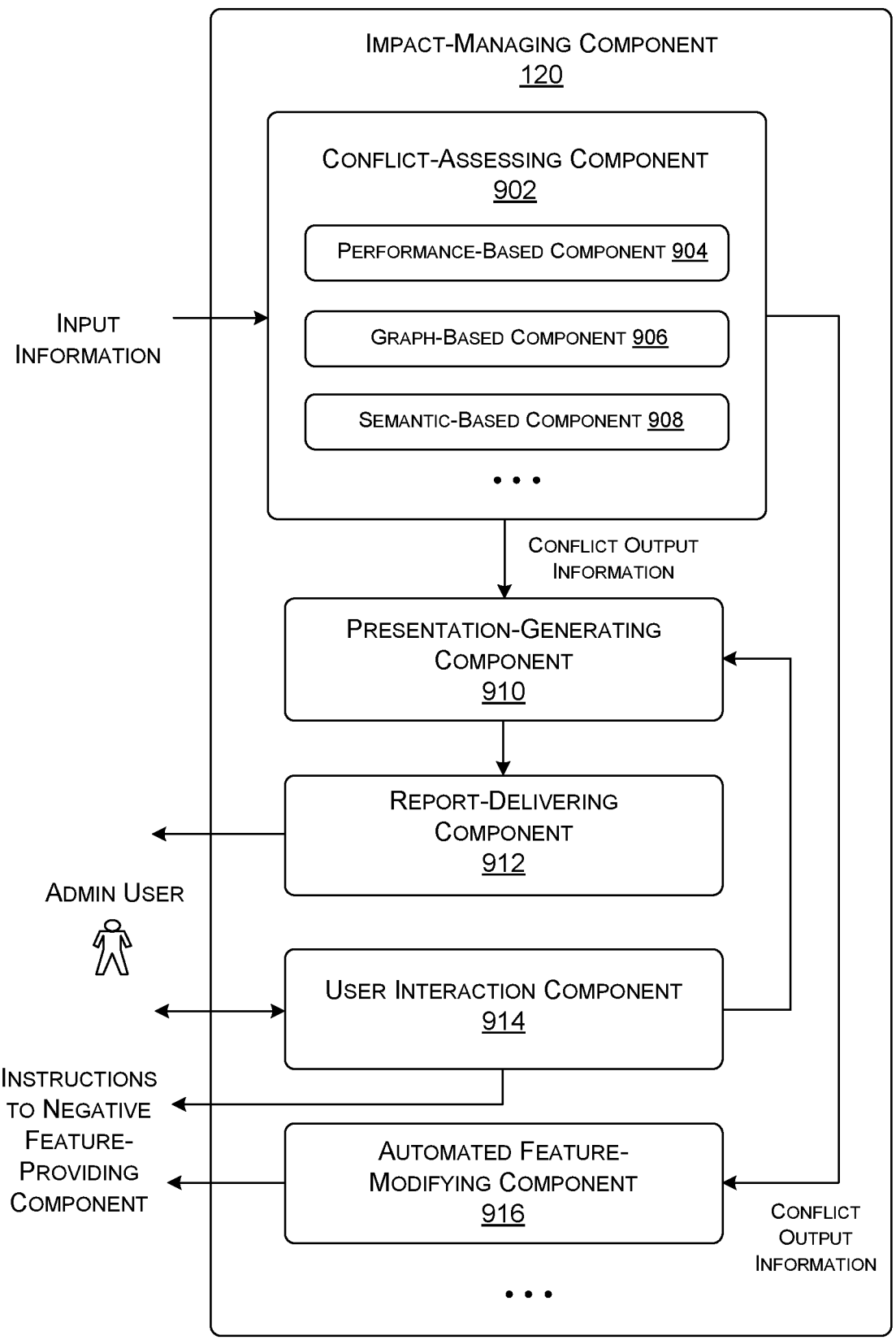
FIG. 9 shows one implementation of an impact-managing component, which is another component of the system environment of FIG. 1.

FIG. 9 shows one implementation of the impact-managing component 120, which is another component of the trigger-identifying system 104 introduced above. The impact-managing component 120 identifies conflicts between the negative features and the positive trigger features, which results in the failure of the item-matching system 106 to surface appropriate electronic ads. The trigger-identifying system 104 can invoke the impact-managing component 120 on a periodic basis (e.g., once a day), and/or on an event-driven basis (e.g., when any agent adds new negative features to the negative feature information).

The impact-managing component 120 includes a conflict-assessing component 902 for determining conflicts between the negative features and the positive trigger features using plural techniques, to provide conflict output information. For instance, a performance-based component 904 can perform empirical analysis for each negative feature which identifies the number of occasions that a query matched a positive trigger feature, but was blocked by the negative feature. If that number of occasions exceeds a prescribed threshold, then the performance-based component 904 can flag the negative keyword for potential removal.

A graph-based component 906 identifies whether a negative feature corresponds to a query that has previously been used to access a web page associated with the web resource. If the number of such queries exceeds a prescribed threshold, then the graph-based component 906 can flag the negative feature for potential removal.

A semantic-based component 908 identifies whether a negative feature maps to a vector in semantic space that is within a prescribed distance to a vector associated with a web page or portion thereof. If so, the semantic-based component 908 can mark the negative feature for potential removal.

The above-described conflict-assessing techniques are cited by way of example, not limitation. Other implementations can use additional techniques and/or can omit any of the techniques described above. In any event, the conflict-assessing component 902 generates a final score for each negative feature that measures the extent to which the negative feature conflicts with the positive trigger information. The score may reflect a weighted combination of values generated by the performance-based component 904, the graph-based component 906, or the semantic-based component 908.

Figure 10:
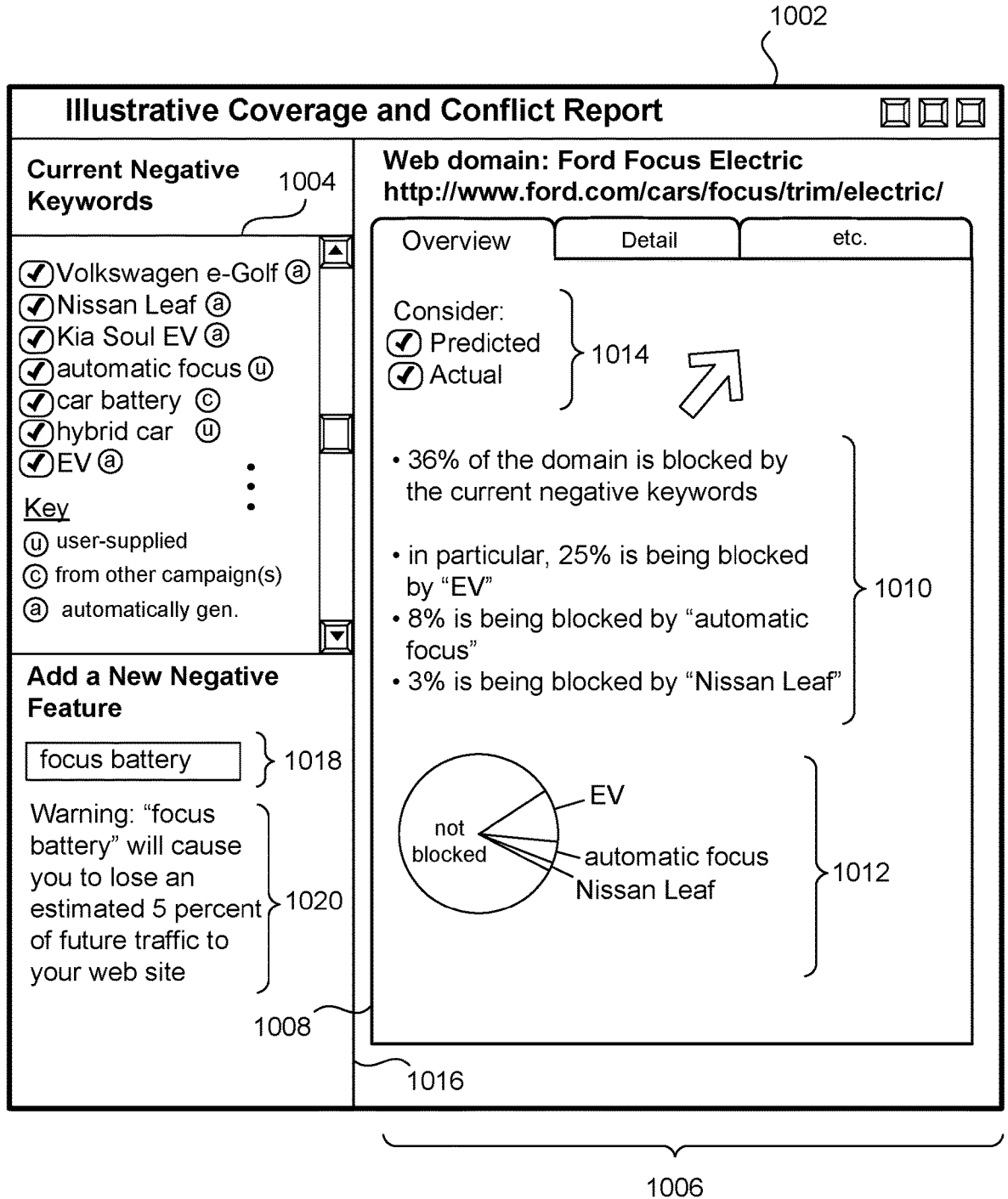
FIG. 10 shows a user interface presentation that provides an interactive report generated by the impact-managing component of FIG. 9.
Figure 11:
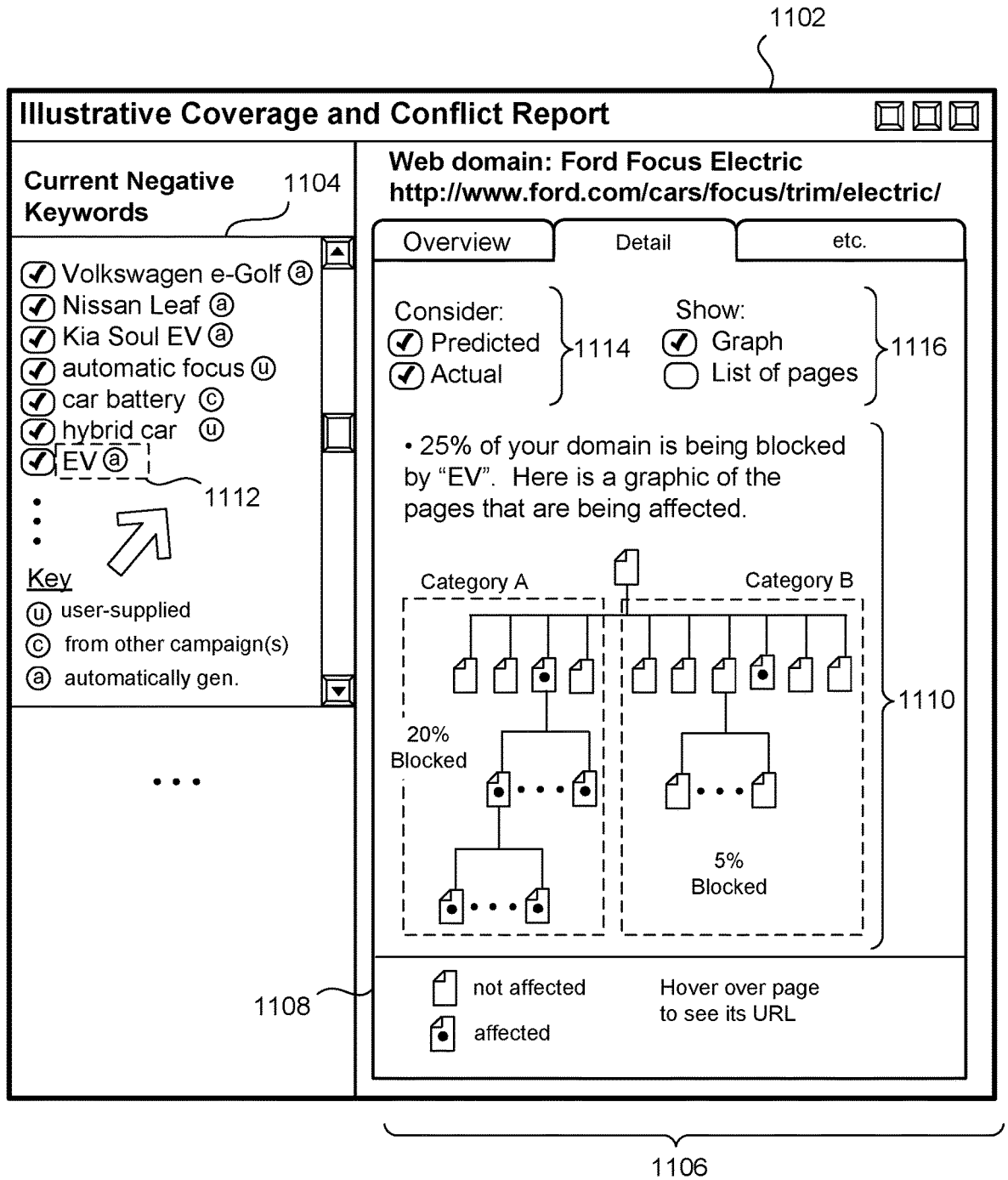
FIG. 11 shows a user interface presentation that provides another interactive report generated by the impact-managing component of FIG. 9.

A presentation-generating component 910 generates one or more reports based on the conflict output information provided by the conflict-assessing component 902. A report-delivering component 912 sends the report(s) to the administrative user. A user interaction component 914 permits the administrative user to interact with the reports. FIGS. 10 and 11, described below, show two illustrative interactive reports that can be provided to the administrative user.

An optional automated feature-modifying component 916 includes a control mechanism for automatically making changes to the negative feature information based on the conflict output information generated by the conflict-assessing component 902. For example, the automatic feature-modifying component 916 can automatically remove all negative features having individual respective scores that exceed a prescribed threshold. In other implementations, the automated feature-modifying component 916 asks for confirmation from the administrative user before removing a negative feature, or at least notifies the administrative user that a negative feature has have been removed, giving the user the option to reverse the removal.

When applied over a span of time, the NFPC 116 can continue to add new negative features to the collection of negative features, and the impact-managing component 120 can continue to remove negative features that are deemed inappropriate. This operation can proceed in a wholly automatic manner or a semi-automated manner. In any event, this operation greatly facilitates the task of managing an ad campaign, and produces a more finely tuned and powerful ad campaign.

FIG. 10 shows a user interface presentation 1002 that provides an interactive report generated by the impact-managing component 120 of FIG. 9. The report includes a first section 1004 that provides a list of the current negative features that collectively make up the negative feature information. The report includes a second section 1006 that describes the impact of the negative features on the ad campaign, e.g., indicating an extent to which the negative features interfere (or are predicted to interfere) with the positive trigger features, and therefore prevent the presentation of matching electronic ads.

More specifically, a first page 1008 of the report provides an overview of the effect of all of the negative features on the web resource as a whole. For instance, in region 1010, the page 1008 provides a textual summary of the impact. In region 1012, the report provides a graph-based summary of the impact.

Using a control feature 1014, the administrative user can instruct the impact-managing component 120 to prepare the report based on different considerations. When the user selects the option bearing the name "actual," the impact-managing component 120 prepares the report based on conflict output information generated by the performance-based component 904. The performance-based component 904, in turn, generates its conflict output information based on actual performance information generated by the performance-monitoring system 108.

When the user selects the option "predicted," the impact-managing component 120 prepares the report based on the conflict output information generated by the graph-based component 906 and/or the semantic-based component 908, and/or based on any other component which generates an estimate of a potential conflict. In other cases, the administrative user can select both "actual" and "predicted," upon which the impact-managing component 120 will prepare a report based on all the components (904, 906, 908) of the conflict-assessing component 902

In section 1016, the user enters a new proposed negative feature (corresponding to "focus battery") into a text entry field 1018. In immediate response, in region 1020, the impact-managing component 120 informs the user that this negative keyword will likely result in a loss of traffic to the web resource. The impact-managing component 120 can make this prediction using its graph-based component 906 and/or the semantic-based component 908.

FIG. 11 shows another user interface presentation 1102 that also includes a first section 1104 that displays the current list of negative features, and a second section 1106 that summarizes the effect of the negative features on the positive trigger features. But here the user has selected a report page that breaks the impact down on a page-by-page level.

More specifically, the page 1108 shows a graphical depiction 1110 of pages in the web resource. The report marks those pages in which at least one negative feature interferes with a positive trigger feature. Alternatively, as shown in the first section 1104, the impact-managing component 120 can receive the user's selection one or more negative features. Here, the user has selected the negative keyword "EV" 1112. The impact-managing component 120 then marks those pages in which the selected negative keyword(s) interfere (or are projected to interfere) with one or more positive trigger features for those pages.

The impact-managing component 120 can also provide additional textual explanation 1113 regarding an underlying reason (or reasons) for a discovered conflict, in any level of textual detail. The impact-managing component 120 can perform this task by mapping the user's selections in setting up the ad campaign to the resultant performance (or predicted performance) of the ad campaign, and then using one or more stored explanation-related templates to describe the established nexus.

A control feature 1114 allows the administrative user to choose whether the report is to be prepared based on actual performance information, or based on analysis that identifies predicted conflicts. A control feature 1116 allows the administrative user to choose the format of the report, e.g., by choosing between a graphical depiction as shown in FIG. 11, or a list of URLs associated with the affected pages.

In certain implementations, the report shown in FIG. 11 can also summarize conflicts with respect to different categories associated with the web resource. For example, FIG. 11 shows that the report summarizes the impact of the negative keyword "EV" for a first group of pages associated with category A, and a second group of pages associated with category B.

The reports shown in FIGS. 10 and 11 are presented in the spirit of illustration, not limitation. Other implementations can convey conflicts using other strategies. For example, another report (not shown) can show the volume of successful matches for each part of the web resource (instead of, or in addition to, the negative feature conflicts). For example, that report can show the number of times that a positive trigger feature was matched for each page associated with a web resource. Such a report can inform the administrative user of the distribution of coverage provided by the ad campaign. A variation of this kind of report can show the coverage provided by the ad campaign (associated with the system environment 102) compared to the coverage provided by one or more simultaneously conducted traditional (e.g., text-based) campaigns.

B. Illustrative Processes

Figure 12:
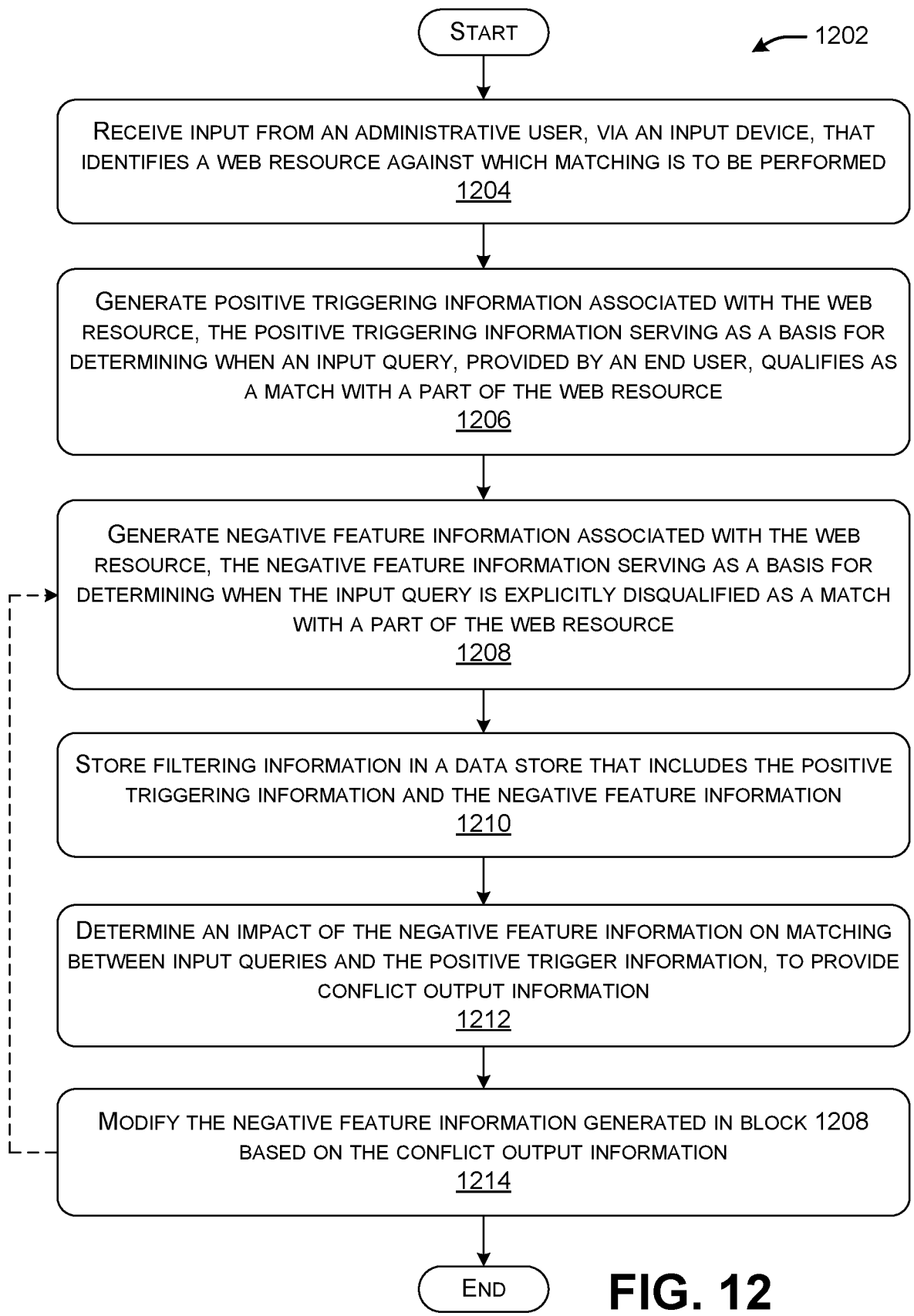
FIG. 12 shows a process that represents one manner of operation of a trigger-identifying system, which is a component of the system environment of FIG. 1.

FIG. 12 shows a process 1202 that explains the operation of the trigger-identifying system 104 of Section A in flowchart form. Since the principles underlying the operation of the trigger-identifying system 104 have already been described in Section A, certain operations will be addressed in summary fashion in this section. As noted in the prefatory part of the Detailed Description, the flowchart is expressed as a series of operations performed in a particular order. But the order of these operations is merely representative, and can be varied in any manner.

In block 1204, the trigger-identifying system 104 receives input from an administrative user, via an input device, that identifies a web resource against which matching is to be performed. In block 1206, the trigger-identifying system 104 generates positive trigger information associated with the web resource, the positive trigger information serving as a basis for determining when an input query, provided by an end user, qualifies as a match with a part of the web resource. In block 1208, the trigger-identifying system 104 generates negative feature information associated with the web resource, the negative feature information serving as a basis for determining when the input query is explicitly disqualified as a match with a part of the web resource. In block 1210, the trigger-identifying system 104 stores filtering information in a data store that includes the positive trigger information and the negative feature information. In block 1212, the trigger-identifying system 104 determines an impact of the negative feature information on matching between input queries submitted by end users and the positive trigger information, to provide conflict output information. In block 1214, the trigger-identifying system 104 modifies the negative feature information based on the conflict output information.

C. Representative Computing Functionality

Figure 13:
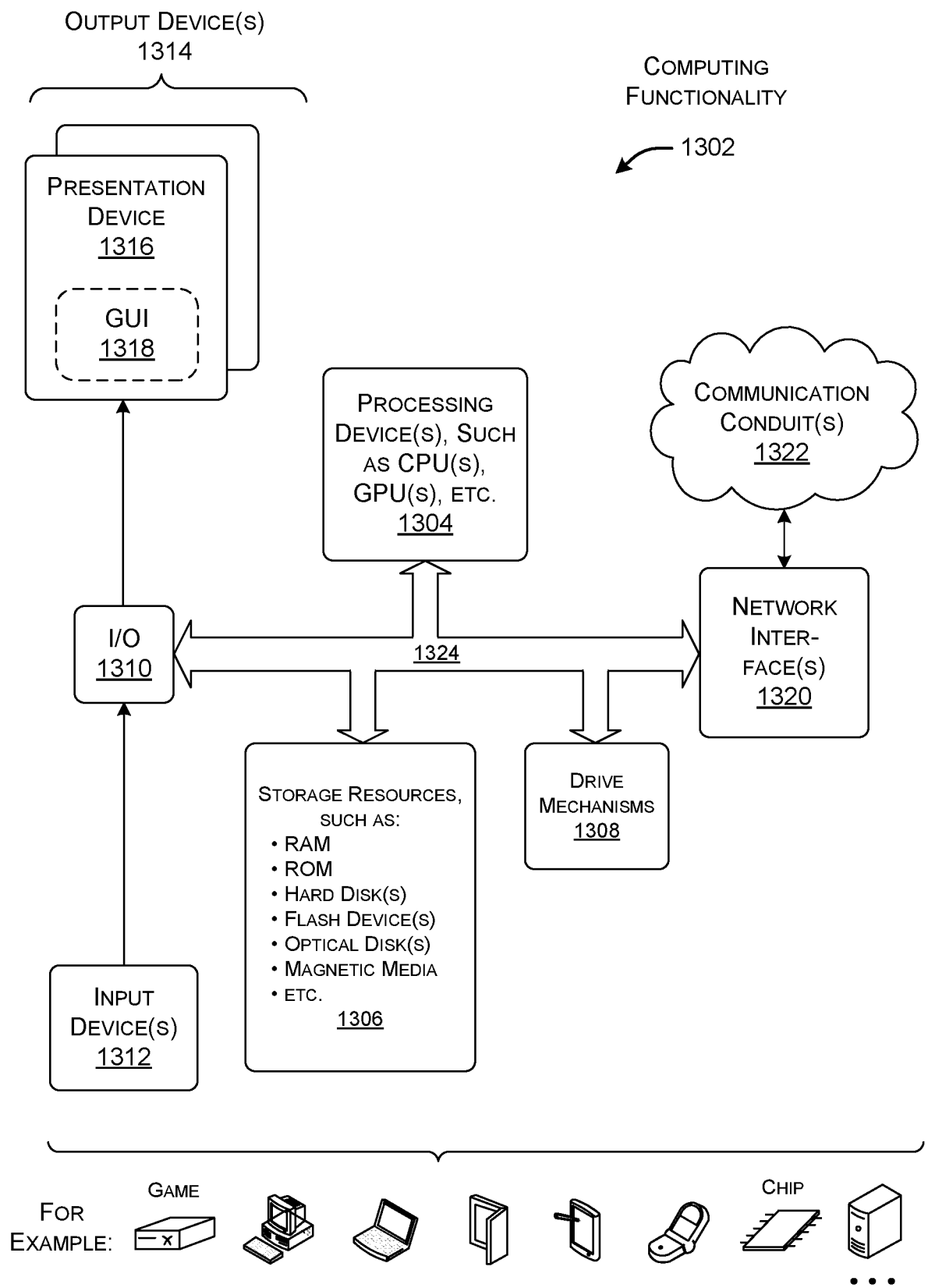
FIG. 13 shows illustrative computing functionality that can be used to implement any aspect of the features shown in the foregoing drawings.

FIG. 13 shows computing functionality 1302 that can be used to implement any aspect of the mechanisms set forth in the above-described figures. For instance, the type of computing functionality 1302 shown in FIG. 13 can be used to implement any computing device that is used to implement the trigger-identifying system 104, the item-matching system 106, the performance-monitoring system 108, etc. of FIG. 1. In all cases, the computing functionality 1302 represents one or more physical and tangible processing mechanisms.

The computing functionality 1302 can include one or more hardware processor devices 1304, such as one or more central processing units (CPUs), and/or one or more graphical processing units (GPUs), and so on. The computing functionality 1302 can also include any storage resources (also referred to as computer-readable storage media or computer-readable storage medium devices) 1306 for storing any kind of information, such as machine-readable instructions, settings, data, etc. Without limitation, for instance, the storage resources 1306 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of the computing functionality 1302. The computing functionality 1302 may perform any of the functions described above when the hardware processor device(s) 1304 carry out computer-readable instructions stored in any storage resource or combination of storage resources. For instance, the computing functionality 1302 may carry out computer-readable instructions to perform each block of the process 1202 described in Section B. The computing functionality 1302 also includes one or more drive mechanisms 1308 for interacting with any storage resource, such as a hard disk drive mechanism, an optical disk drive mechanism, and so on.

The computing functionality 1302 also includes an input/output component 1310 for receiving various inputs (via input devices 1312), and for providing various outputs (via output devices 1314). Illustrative input devices include a keyboard device, a mouse input device, a touchscreen input device, a digitizing pad, a voice recognition mechanism, etc. One particular output mechanism may include a display device 1316 and an associated graphical user interface presentation (GUI) 1318. For instance, the impact-managing component 120 can present its various user interface presentations (e.g., shown in the FIGS. 10 and 11) on the display device 1316. The display device 1316 may correspond to a charge-coupled display device, a cathode ray tube device, a projection mechanism, etc. Other output devices include one or more speakers, a haptic output mechanism, an archival mechanism, and so on. The computing functionality 1302 can also include one or more network interfaces 1320 for exchanging data with other devices via one or more communication conduits 1322. One or more communication buses 1324 communicatively couple the above-described components together.

The communication conduit(s) 1322 can be implemented in any manner, e.g., by a local area computer network, a wide area computer network (e.g., the Internet), point-to-point connections, etc., or any combination thereof. The communication conduit(s) 1322 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 1302 (and its hardware processor) can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc. In this case, the machine-executable instructions are embodied in the hardware logic itself.

D. Appendix: Illustrative Semantic Model

This appendix section, which forms a part of the Detailed Description, describes one implementation of a deep-learning semantic model 1402 for comparing two linguistic items in abstract semantic space 1404. Different components of the system environment 102 of FIG. 1 can leverage the semantic model 1402, including the PTGC 114, the NFPC 116, the impact-managing component 120, and the item-matching system 106. To cite one example, the impact-generating component 120 can use the semantic model 1402 to map a web page or portion thereof to a first vector in the semantic space 1404, and then map a negative keyword to a second vector in the same semantic space 1404. The relation of the first vector to the second vector in the semantic space provides some insight as to whether the negative keyword will interfere with a positive trigger feature associated with the web page. That is, if the vectors are close together, the negative keyword can be expected to interfere with the positive trigger feature for the web page.

The semantic model 1402 is explained below in a generic context in which two linguistic items are projected into the abstract semantic space and then compared. That is, a first semantic transformation component 1406 transforms a first linguistic item X into a first vector $y_X$, and a second semantic transformation component 1408 transforms a second linguistic item Y into a second vector $y_Y$, where X and Y refer to any linguistic expressions, such as web page content and a negative keyword, respectively. A comparison component 1410 then compares the first semantic vector $y_X$ with the second semantic vector $y_Y$.

Figure 14:
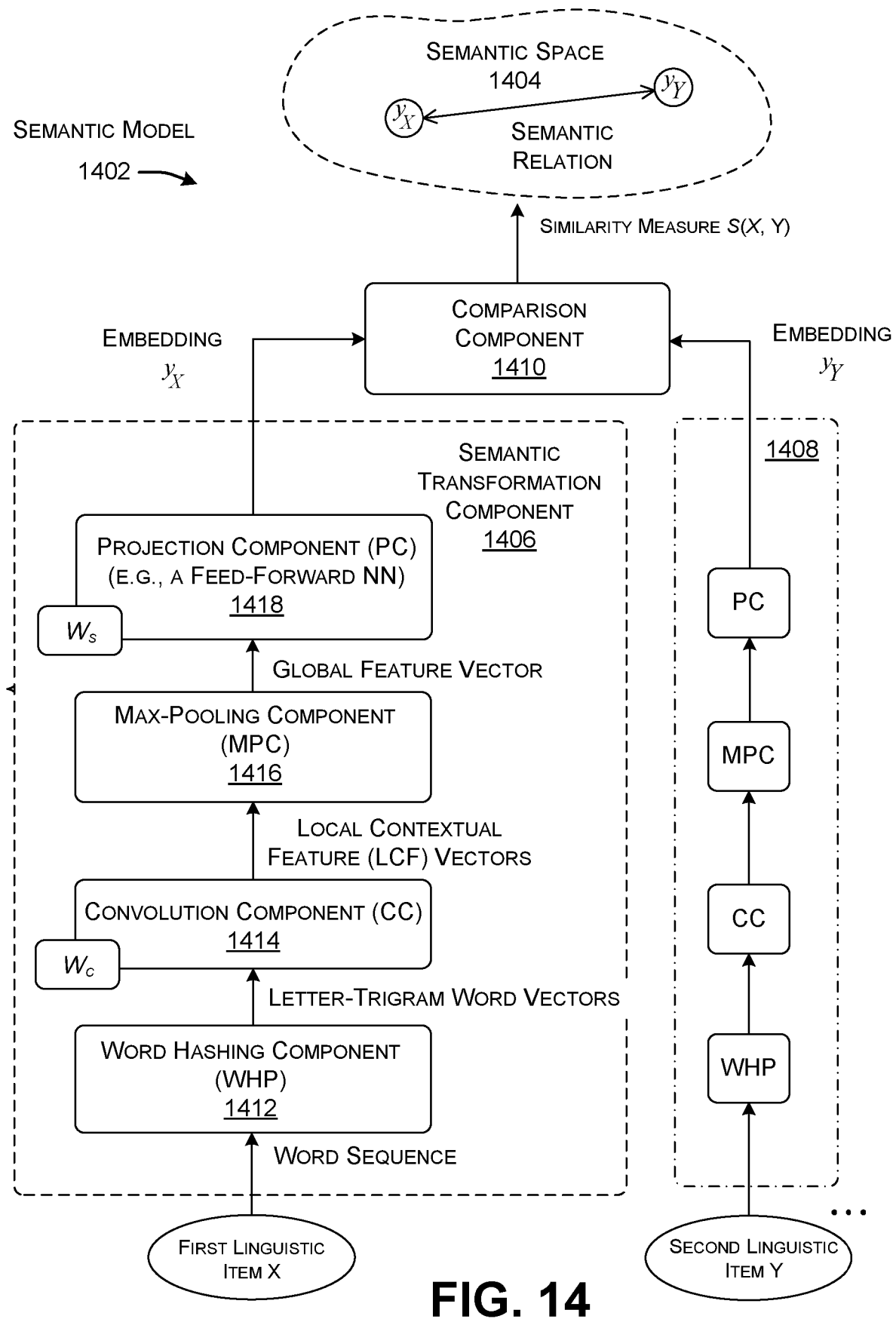
FIGS. 14 and 15 provide details regarding one illustrative implementation of a machine-learned semantic model that can be used to determine the relation of two linguistic items.
Figure 15:
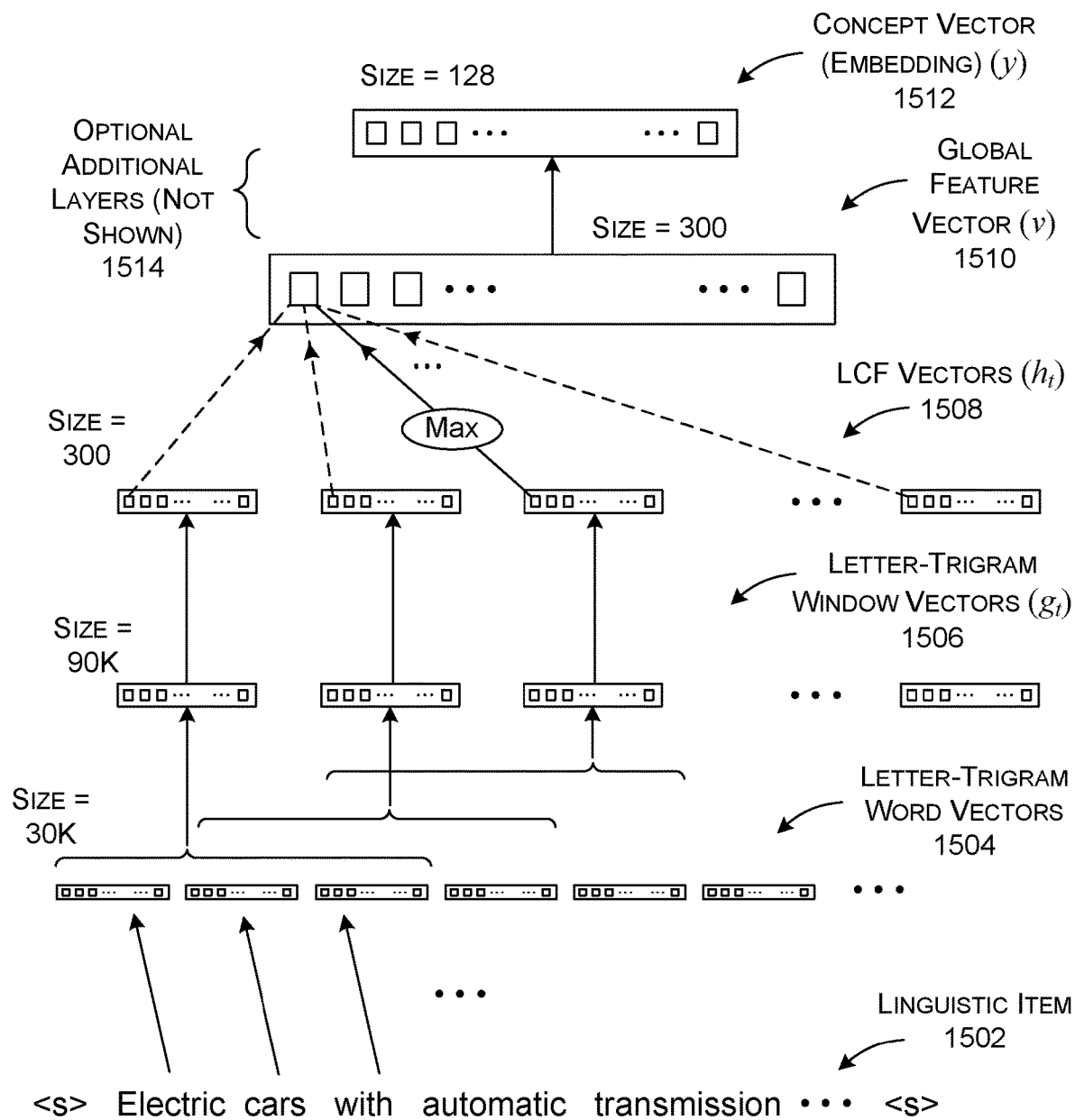

FIG. 15 shows a yet more detailed implementation of the first semantic transformation component 1406. Hence, the first semantic transformation component 1406 will be described below by making simultaneous reference to both FIGS. 14 and 15. Note that the second semantic transformation component 1408 has a similar composition and process flow compared to the first semantic transformation component 1406.

To begin with, assume that the first linguistic item X corresponds to a portion of a word sequence 1502 which reads, "Electric cars with automatic transmission . . . ." As a first operation, a word hashing component 1412 can add dummy tokens to the beginning and ending of the word sequence 1502, such as the symbol "<s>" shown in FIG. 15. The word hashing component 1412 can then form a letter-n-gram representation of each word in the word sequence 1502. For example, consider the fourth word, "Electric," in the word sequence 1502. The word hashing component 1412 can form a letter-trigram representation of this word by moving a three-letter window across the word to produce a succession of three-letter character groupings, e.g., to produce "Ele", "lec," "ect," "ctr", "tri," and "ric."

The word hashing component 1412 then forms a letter-trigram word vector for each word that expresses the particular letter-trigrams that appear in the word, where the term "letter-trigram word vector" refers to a representation of a word based on a letter-trigram construction. More specifically, each letter-trigram word vector has a number of dimensions corresponding to the total number of three-letter sequences that may appear in a particular natural language, such as English. (But the vector may optionally exclude certain uninteresting letter-trigrams for application-specific reasons.) The word hashing component 1412 can form a letter-trigram word vector for a particular word by counting the number of letter-trigrams of each particular type that appear in the word, and then setting values, at corresponding dimensions in the vector, to reflect those counts. For example, the word "electric" would include a "1" entry for each of the trigrams described above ("ele", "lec," "ect", etc.), and a "0" entry for all other dimensions, or vice versa. If a particular letter-trigram appears more than once in a particular word, then the count for that dimension would reflect how many times that letter-trigram appears in the word.

As a result of the above operation, the word hashing component 1412 forms a set of word vectors 1504 shown in FIG. 15, one for each word in the word sequence 1502. In one non-limiting implementation, each letter-trigram word vector has a dimensionality of 30,000, corresponding to the total number of unique letter-trigrams that can appear in a particular word vocabulary. Each letter-trigram word vector is sparsely populated in the sense that it includes only a small number of non-zero entries.

In a next stage, a convolution component 1414 slides an n-word window across the word sequence 1502, to identify a series of word groupings, each formed by n consecutive words (here n=3). For example, the convolution component 1414 identifies a first word grouping having the words "<s> Electric car" (where the <s> token is considered as a word), a second word grouping having the words "cars with automatic," a third word grouping having the words "with automatic transmission," and so on. The convolution component 1414 then transforms each word grouping into a local contextual feature (LCF) vector.

More specifically, consider the operations of the convolution component 1414 with respect to a particular window, such as the window that identifies the three words "Electric," "cars," and "with." The convolution component 1414 first concatenates the letter-trigram word vectors associated with the words in the window, to form a letter-trigram window vector (where the term "letter-trigram window vector" refers to a representation of a window using a letter-trigram construction). The letter-trigram window vector has 90,000 dimensions in the particular example of FIG. 15 because it is formed by concatenating three 30,000-dimension vectors. Overall, as shown in FIG. 15, the convolution component 1414 produces a total number T of letter-trigram window vectors 1506, with letter-trigram window vector $g_t$ referring to one of the T letter-trigram window vectors.

Next, the convolution component 1414 transforms each letter-trigram window vector ($g_t$) into a local contextual feature (LCF) vector ($h_t$), using a machine-learned matrix $W_c$, referred to herein as a convolution matrix. This operation yields a total number T of local contextual feature (LCF) vectors 1508, where T depends on a number of words in the word sequence 1502. More specifically, the convolution component 1414 may compute a particular LCF vector $h_t$ as:

$$h_t = \tan h(W_c \cdot g_t) \quad (1).$$

The tan h function constitutes a particular activation function, and is given by:

$$\tanh(x) = \frac{1-e^{-2x}}{1+e^{-2x}}. \quad (2)$$

Each LCF vector may have a greatly reduced dimensionality compared to its corresponding letter-trigram window vector, and its contributing letter-trigram word vectors. For example, the LCF vector may have (in one non-limiting case) a dimensionality of 300, whereas its corresponding letter-trigram window vector has a dimensionality of 90,000.

In a next phase of operation, a max-pooling component 1416 forms a single global feature vector v (1510) by pulling respective maximum values from the LCF vectors 1508. More specifically, consider the first element of the global feature vector v, corresponding to the first dimension of that vector. The max-pooling component 1416 identifies the values expressed by the corresponding first elements of the LCF vectors, and then selects the maximum value among those values. The max-pooling component 1416 then inserts that maximum value into the first element of the global feature vector v. More formally stated, the values of the global feature vector can be computed by the equation:

$$v(i) = \max_{t=1,...T}\{h_t(i)\}, i = 1, ... K. \quad (3)$$

Here, i refers to a particular element and a particular dimension in the global feature vector v, and, correspondingly, in each of the T LCF vectors, $h_t$. K is the total number of elements (and dimensions) in the global feature vector. More specifically, the global feature vector v has the same dimensionality of each of the individual LCF vectors, e.g., 300 in one particular case. From a high-level standpoint, the max-pooling operation has the effect of selecting the most semantically salient words in the input word sequence 1502.

Finally, a projection component 1418 projects the global feature vector v into a continuous-valued concept vector y (1512) (also referred to as an embedding) using a machine-learned semantic projection matrix $W_s$. More specifically, the projection component 1418 may generate the concept vector y using the following equation:

$$y = \tan h(W_s \cdot v) \quad (4).$$

The tanh function may correspond to the same activation function expressed by Equation (2). In other words, the elements of the global feature vector v constitute neurons in a one layer of a feed-forward neural network. Likewise, the elements of each particular concept vector y constitute neurons in another, subsequent, layer of the neural network. Equations (4) and (2) describe how the values of the neurons in the concept vector y are computed from the values of the neurons in the global feature vector v. In other implementations, the projection component 1418 produces the concept vector y by transforming the global feature vector v using one or more additional intermediate neural network layers 1514 (not specifically shown in FIG. 15). In that case, the projection component 1418 forms a multi-layer neural network. Overall, the concept vector y accurately represents both the local linguistic context of words in the first linguistic item, as well as the global meaning of the first linguistic item as a whole.

In the context of FIG. 14, the concept vector y described above corresponds to the first semantic vector $y_X$. The second semantic transformation component 1408 performs the same operations described above e.g., by transforming the second linguistic item Y into the second semantic vector $y_Y$. The comparison component 1410 then computes the similarity between the vector $y_X$ and the vector $y_Y$ in the semantic space 1404, e.g., using the following cosine similarity equation:

$$S(X, Y) = \text{cosine}(y_X, y_Y) = \frac{y_X \cdot y_Y}{\|y_X\|\|y_Y\|}.$$

That is, the value S(X, Y), referred to herein as a score value or similarity relation, reflects the similarity or closeness between the first linguistic item X and the second linguistic item Y in the semantic space 1404.

The following summary provides a non-exhaustive list of illustrative aspects of the technology set forth herein.

According to a first aspect, a system environment is described, implemented by one or more computing devices, for providing information items to end users. The system includes a trigger-identifying system that includes: a user interface component configured to receive input from an administrative user, and to provide output to the administrative user; a trigger-generating component configured to generate positive trigger information based on a web resource identified by the administrative user via the user interface component, the positive trigger information serving as a basis for determining when an input query, provided by an end user, qualifies as a match with a part of the web resource; a negative feature-providing component configured to supply negative feature information, the negative feature information serving as a basis for determining when the input query is explicitly disqualified as a match with a part of the web resource; and a data store for storing filtering information that includes the positive trigger information and the negative feature information. The trigger-identifying system also includes an impact-managing component including: a conflict-assessing component configured to determine an impact of the negative feature information on matching between input queries provided by end users and the positive trigger information, to provide conflict output information; and a control mechanism configured to instruct the negative feature-providing component to modify the negative feature information based on the conflict output information. The system also includes an item-matching system configured to deliver information items to end users based on matching between the input queries and the positive trigger information. The system also includes a performance-monitoring system configured to monitor performance of the item-matching system, to generate performance information, and to supply the performance information to the trigger-identifying system for use thereby in generating the filter information.

According to a second implementation, the information items provided by the item-matching system correspond to electronic ads.

According to a third aspect, the negative feature-providing component receives at least some of the negative feature information from the administrative user, the above-referenced at least some of the negative feature information including negative keywords explicitly specified by the administrative user.

According to a fourth aspect, the trigger-identifying system works in conjunction with a first ad campaign, and wherein the negative feature-providing component receives at least some of the negative feature information from one or more other ad campaigns, the above-referenced at least some of the negative feature information including negative keywords used by the above-referenced one or more other ad campaigns.

According to a fifth aspect, the negative feature-providing component receives at least some of the negative feature information from a performance-assessing component, the performance-assessing component providing the above-referenced at least some of the negative feature information based on an assessment of performance of the positive trigger information in the matching performed by the item-matching system.

According to a sixth aspect, the conflict-assessing component is configured to determine the impact by determining an empirical performance-based impact of the negative feature information on matching between the input queries submitted by end users and the positive trigger information.

According to a seventh aspect, the conflict-assessing component is configured to determine the impact by determining whether there are any semantic-based conflicts between the negative feature information and the positive trigger information.

According to an eighth aspect, the impact-managing component further includes: a presentation-generating component configured to generate a report based on the conflict output information generated by the conflict-assessing component; and a report-delivering component configured to provide the report to the administrative user.

According to a ninth aspect, the report generated by the presentation-generating component provides a summary of an extent to which the negative feature information impacts matching between the input queries and the positive trigger information.

According to a tenth aspect, the report identifies an extent to which the negative feature information impacts matching between the input queries and individual parts of the web resource, and with respect to individual negative features of the negative feature information.

According to an eleventh aspect, the impact-managing component is configured to: receive a new negative feature from the administrative user; determine an estimated impact of the new negative feature on matching between the input queries and the positive trigger information, to generate estimated impact information; and provide a report to the administrative user that conveys the estimated impact information.

According to a twelfth aspect, the control mechanism includes a user interaction component configured to receive an explicit selection by the administrative user of one or more negative features to be removed from the negative feature information, the administrative user making the explicit selection in response to the conflict output information generated by the conflict-assessing component.

According to a thirteenth aspect, the control mechanism includes an automated feature-modifying component configured to automatically modify the negative feature information based on the conflict output information provided by the conflict-assessing component.

According to a fourteenth aspect, a trigger-identifying system is described, implemented by one or more computing devices, for generating filtering information for use in controlling an information matching operation. The system includes a user interface component configured to receive input from an administrative user, and to provide output to the administrative user. The system also includes a trigger-generating component configured to generate positive trigger information based on a web resource identified by the administrative user via the user interface component, the positive trigger information serving as a basis for determining when an input query, provided by an end user, qualifies as a match with a part of the web resource. The system also includes a negative feature-providing component configured to supply negative feature information, the negative feature information serving as a basis for determining when the input query is explicitly disqualified as a match with a part of the web resource, and a data store for storing filtering information that includes the positive trigger information and the negative feature information. The system also includes an impact-managing component including: a conflict-assessing component configured to determine an impact of the negative feature information on matching between input queries provided by end users and the positive trigger information, to provide conflict output information; and a control mechanism configured to instruct the negative feature-providing component to modify the negative feature information based on the conflict output information.

According to a fifteenth aspect, the negative feature-providing component receives: first negative feature information from the administrative user, the first negative feature information including negative keywords specified by the administrative user; and/or second negative feature information from one or more ad campaigns outside a context of an ad campaign associated with the trigger-identifying system; and/or third negative feature information from one or more automated negative feature-generating components.

According to a sixteenth aspect, the conflict-assessing component is configured to determine the impact by: determining an empirical performance-based impact of the negative feature information on matching between the input queries submitted by end users and the positive trigger information; and/or determining whether there are any semantic-based conflicts between the negative keyword information and the positive trigger information.

According to a seventeenth aspect, the impact-managing component further includes: a presentation-generating component configured to generate a report based on the conflict output information generated by the conflict-assessing component; and a report-delivering component configured to provide the report to the administrative user.

According to an eighteenth aspect, the control mechanism includes a user interaction component configured to receive an explicit selection by the administrative user of one or more negative features to be removed from the negative feature information, the administrative user making the explicit selection in response to the conflict output information generated by the conflict-assessing component.

According to a nineteenth aspect, the control mechanism includes an automated feature-modifying component configured to automatically modify the negative feature information based on the conflict output information provided by the conflict-assessing component.

According to a twentieth aspect, a method is described, implemented by one or more computing devices, for providing information items to end users. The method includes: receiving input from an administrative user, via an input device, that identifies a web resource against which matching is to be performed; generating positive trigger information associated with the web resource, the positive trigger information serving as a basis for determining when an input query, provided by an end user, qualifies as a match with a part of the web resource; generating negative feature information associated with the web resource, the negative feature information serving as a basis for determining when the input query is explicitly disqualified as a match with a part of the web resource; storing filtering information in a data store that includes the positive trigger information and the negative feature information; determining an impact of the negative feature information on matching between input queries submitted by end users and the positive trigger information, to provide conflict output information; and modifying the negative feature information based on the conflict output information.

A twenty-first aspect corresponds to any combination (e.g., any permutation or subset that is not logically inconsistent) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system, implemented by one or more computing devices, for providing information items to end users, comprising:
   a trigger-identifying system, including:
      a user interface component configured to receive input from an administrative user, and to provide output to the administrative user;
      a trigger-generating component configured to extract content from a web resource identified by the administrative user via the user interface component and then generate positive trigger information based on content that is extracted, the positive trigger information serving as a basis for determining when an input query, provided by an end user, qualifies as a match with a part of the web resource, the web resource corresponding to a web site that includes one or more web pages;
      a negative feature-providing component configured to supply negative feature information, the negative feature information serving as a basis for determining when the input query is explicitly disqualified as a match with a part of the web resource;
      a data store for storing filtering information that includes the positive trigger information and the negative feature information; and
      an impact-managing component including:
         a conflict-assessing component configured to determine an impact of the negative feature information in disqualifying matching between input queries provided by end users and the positive trigger information, when the input queries contain the negative feature information input by the end users, to provide conflict output information; and a control mechanism configured to instruct the negative feature-providing component to modify the negative feature information based on the conflict output information;

an item-matching system configured to deliver information items to end users based on matching between the input queries and the positive trigger information, and based on consideration of the negative feature information; and a performance-monitoring system configured to monitor performance of the item-matching system, to generate performance information, and to supply the performance information to the trigger-identifying system for use thereby in generating the filtering information.

2. The system of claim 1, wherein the impact-managing component further includes:

a presentation-generating component configured to generate a report based on the conflict output information generated by the conflict-assessing component; and a report-delivering component configured to provide the report to the administrative user.

3. The system of claim 2, wherein the report identifies an extent to which the negative feature information interferes with matching between the input queries and positive trigger information by specifying a total portion of the web resource that is being blocked by the negative feature information by specifying a percentage of the web resource in a range of percentages, in at least one case, the total portion corresponding to a non-zero portion of the web resource but not an entirety of the web resource.

4. The system of claim 2, wherein the web resource has plural pages, and wherein the report identifies an extent to which the negative feature information interferes with matching between the input queries and positive trigger information extracted from individual pages of the web resource, by separately identifying one or more individual pages of the web resource that are interfered with.

5. A computer-readable storage medium for storing computer-readable instructions, the computer-readable instructions, when executed by one or more hardware processors, performing a method that comprises:

receiving input from an administrative user, and providing output to the administrative user;

extracting content from a web resource identified by the administrative user via the input that is received and then generating positive trigger information based on content that is extracted, the positive trigger information serving as a basis for determining when an input query, provided by an end user, qualifies as a match with a part of the web resource, the web resource corresponding to a web site that includes one or more web pages;

supplying negative feature information, the negative feature information serving as a basis for determining when the input query is explicitly disqualified as a match with a part of the web resource;

storing filtering information that includes the positive trigger information and the negative feature information;

determining an impact of the negative feature information in disqualifying matching between input queries provided by end users and the positive trigger information, when the input queries contain the negative feature information input by the end users, to provide conflict output information; and instructing the negative feature-providing component to modify the negative feature information based on the conflict output information;

wherein an item-matching system delivers information items to end users based on matching between the input queries and the positive trigger information, and based on consideration of the negative feature information, and wherein a performance-monitoring system monitors performance of the item-matching system, to generate performance information.

6. The computer-readable storage medium of claim 5, wherein said determining the impact determines the impact by determining whether there are any semantic-based conflicts between the negative feature information and the positive trigger information.

7. The computer-readable storage medium of claim 5, wherein said determining the impact further includes:

generating a report based on the conflict output information; and providing the report to the administrative user.

8. The computer-readable storage medium of claim 5, wherein said instructing includes receiving an explicit selection by the administrative user of one or more negative features to be removed from the negative feature information, the administrative user making the explicit selection in response to the conflict output information.

9. The computer-readable storage medium of claim 5, wherein said instructing includes automatically modifying the negative feature information based on the conflict output information.

10. A method, performed by one or more computing devices, for providing information items to end users, comprising:

receiving input from an administrative user, via an input device, that identifies a web resource against which matching is to be performed, the web resource corresponding to a web site that includes one or more web pages;

generating positive trigger information associated with the web resource based on content extracted from the web resource, the positive trigger information serving as a basis for determining when an input query, provided by an end user, qualifies as a match with a part of the web resource;

generating negative feature information associated with the web resource, the negative feature information serving as a basis for determining when the input query is explicitly disqualified as a match with a part of the web resource;

storing filtering information in a data store that includes the positive trigger information and the negative feature information;

determining an impact of the negative feature information in disqualifying matching between input queries submitted by end users and the positive trigger information when the input queries contain the negative feature information input by the end users, to provide conflict output information;

modifying the negative feature information based on the conflict output information;

delivering information items to the end users based on matching between the input queries and the positive trigger information, and based on consideration of the negative feature information; and monitoring performance of said delivering information items, to generate performance information.

11. The computer-readable storage medium of claim 5, wherein said receiving input comprises receiving input from the administrative user that identifies one or more selected sections of the web resource, wherein the input queries are to be matched against positive feature information extracted from the said one or more selected sections of the web resource.

12. The computer-readable storage medium of claim 5, wherein said receiving input comprises receiving input from the administrative user that specifies subsets of web pages associated with the web resource, and wherein said extracting content performs separate analysis for the subsets of web pages.

13. The computer-readable storage medium of claim 5, wherein said extracting content comprises automatically identifying subsets of web pages associated with the web resource, and wherein said extracting content performs separate analysis for the subsets of web pages.

14. The computer-readable storage medium of claim 6, wherein said determining the impact determines whether there are any semantic-based conflicts between the negative feature information and the positive trigger information by, for at least one negative feature:

mapping a negative feature into a vector in semantic space; and determining whether the vector is within a prescribed distance of another vector associated with a web page or portion thereof associated with the web resource.

15. The computer-readable storage medium of claim 7, wherein the report identifies an extent to which the negative feature information interferes with matching between the input queries and positive trigger information by specifying a total portion of the web resource that is being blocked by the negative feature information by specifying a percentage of the web resource in a range of percentages, in at least one case, the total portion of the web resource corresponding to a non-zero portion of the web resource but not an entirety of the web resource.

16. The computer-readable storage medium of claim 15, wherein the report partitions the total portion of the web resource into one or more sub-portions associated with one or more negative features that interfere with matching.

17. The computer-readable storage medium of claim 7, wherein the web resource has plural pages, and wherein the report identifies an extent to which the negative feature information interferes with matching between the input queries and positive trigger information extracted from individual pages of the web resource, by separately identifying one or more individual pages of the web resource that are interfered with.

18. The computer-readable storage medium of claim 7, wherein said generating the report identifies selections made by the administrative user in setting up an information item campaign that have led to conflicts between the positive trigger information and the negative feature information, wherein one of said selections made by the user is a rule that specifies that the input queries are to be matched against positive feature information extracted from at least one selected section of the web resource.

19. The system of claim 2, wherein the report also identifies selections made by the administrative user in setting up an information item campaign via the user interface component that have led to conflicts between the positive trigger information and the negative feature information, wherein one of said selections made by the user is a rule that specifies that the input queries are to be matched against positive feature information extracted from at least one selected section of the web resource.

20. The method of claim 10, further including generating a report based on the conflict output information, the report identifying selections made by the administrative user in setting up an information item campaign that have led to conflicts between the positive trigger information and the negative feature information, wherein one of said selections made by the user is a rule that specifies that the input queries are to be matched against positive feature information extracted from at least one selected section of the web resource.

* * * * *